US00RE42892E

(19) United States
(12) Reissued Patent
Montulli

(10) Patent Number: US RE42,892 E
(45) Date of Reissued Patent: Nov. 1, 2011

(54) METHOD AND APPARATUS FOR MAINTAINING STATE INFORMATION ON AN HTTP CLIENT SYSTEM IN RELATION TO SERVER DOMAIN AND PATH ATTRIBUTES

(75) Inventor: Lou Montulli, Reno, NV (US)

(73) Assignee: Netscape Communications Corporation, Mountain View, CA (US)

(21) Appl. No.: 10/272,896

(22) Filed: Oct. 17, 2002
(Under 37 CFR 1.47)

Related U.S. Patent Documents

Reissue of:
(64) Patent No.: 6,134,592
Issued: Oct. 17, 2000
Appl. No.: 08/918,977
Filed: Aug. 27, 1997

U.S. Applications:
(62) Division of application No. 08/540,342, filed on Oct. 6, 1995, now Pat. No. 5,774,670.

(51) Int. Cl.
*G06F 13/38* (2006.01)
*G06F 15/17* (2006.01)

(52) U.S. Cl. ..... 709/229; 709/203; 709/218; 709/227

(58) Field of Classification Search ..... 709/203
See application file for complete search history.

(56) References Cited

U.S. PATENT DOCUMENTS 4,305,059 A 12/1981 Benton
4,484,304 A 11/1984 Anderson et al.
(Continued)

FOREIGN PATENT DOCUMENTS

EP 0 172 670 2/1986
(Continued)

OTHER PUBLICATIONS

Andreessen et al "NCSA Mosaic Technical Summary", NCSA Mosaic Technical Summary 2.1 (May 8, 1993) pp. 1-5.*
(Continued)

*Primary Examiner* — Robert B Harrell
(74) *Attorney, Agent, or Firm* — Michael A. Glenn; Glenn Patent Group

(57) ABSTRACT

A method and apparatus for transferring state information between a server computer system and a client computer system. In one embodiment of the method, an http client requests a file, such as an HTML document, on an http server, and the http server transmits the file to the http client. In addition, the http server transmits a state object, which describes certain state information, to the http client. The http client stores the state object, and will typically send the state object back to the http server when making later requests for files on the http server. In a typical embodiment, the state object includes a domain attribute which specifies a domain or network address, and the state object is transmitted from the http client to a server only when the http client makes an http request to the server and the server is within the domain. In one embodiment, the apparatus includes a processor and memory and a computer readable medium which stores program instructions. In the case of the client system, the instructions specify operations such as receiving and storing the state information; in the case of the server system, the instructions specify operations such as sending the state information to a client system.

28 Claims, 8 Drawing Sheets

U.S. PATENT DOCUMENTS 4,528,643 A 7/1985 Freeny, Jr.
4,529,870 A 7/1985 Chaum
4,566,078 A 1/1986 Crabtree
4,578,530 A 3/1986 Zeidler
4,734,858 A 3/1988 Schlafly
4,755,940 A 7/1988 Brachtl et al.
4,759,063 A 7/1988 Chaum
4,759,064 A 7/1988 Chaum
4,775,935 A 10/1988 Yourick
4,795,890 A 1/1989 Goldman
4,799,156 A 1/1989 Shavit et al.
4,812,628 A 3/1989 Boston et al.
4,827,508 A 5/1989 Shear
4,891,503 A 1/1990 Jewell
4,922,521 A 5/1990 Krikke et al.
4,926,480 A 5/1990 Chaum
4,935,870 A 6/1990 Burk, Jr. et al.
4,941,089 A 7/1990 Fischer
4,947,028 A 8/1990 Gorog
4,947,430 A 8/1990 Chaum
4,949,380 A 8/1990 Chaum
4,972,318 A 11/1990 Brown et al.
4,977,595 A 12/1990 Ohta et al.
4,982,346 A 1/1991 Girouard et al.
4,987,593 A 1/1991 Chaum
4,991,210 A 2/1991 Chaum
4,992,940 A 2/1991 Dworkin
4,996,711 A 2/1991 Chaum
5,025,373 A 6/1991 Keyser, Jr. et al.
5,035,515 A 7/1991 Crossman et al.
5,056,712 A 10/1991 Enck
5,060,153 A 10/1991 Nakagawa
5,077,607 A 12/1991 Johnson et al.
5,105,184 A 4/1992 Pirani et al.
5,204,947 A 4/1993 Bernstein et al.
5,220,501 A 6/1993 Lawlor et al.
5,226,079 A 7/1993 Holloway
5,247,575 A 9/1993 Sprague et al.
5,276,736 A 1/1994 Chaum
5,297,249 A 3/1994 Bernstein et al.
5,305,195 A 4/1994 Murphy
5,309,437 A 5/1994 Perlman et al.
5,311,594 A 5/1994 Penzias
5,319,542 A 6/1994 King, Jr. et al.
5,321,751 A 6/1994 Ray et al.
5,325,362 A 6/1994 Aziz
5,336,870 A 8/1994 Hughes
5,341,429 A 8/1994 Stringer et al.
5,347,632 A 9/1994 Filepp et al.
5,351,186 A 9/1994 Bullock et al.
5,351,293 A 9/1994 Michener et al.
5,353,283 A 10/1994 Tsuchiya
5,355,453 A 10/1994 Row et al.
5,367,635 A 11/1994 Bauer
5,367,645 A 11/1994 Lubeck et al.
5,383,113 A 1/1995 Kight et al.
5,388,257 A 2/1995 Bauer
5,414,833 A 5/1995 Hershey et al.
5,457,738 A 10/1995 Sylvan
5,475,585 A 12/1995 Bush
5,483,652 A 1/1996 Sudama et al.
5,491,820 A 2/1996 Belove et al.
5,521,631 A 5/1996 Budow et al.
5,530,849 A 6/1996 Hanushevsky et al.
5,530,852 A 6/1996 Meske, Jr. et al.
5,535,229 A 7/1996 Hain, Jr. et al.
5,544,320 A 8/1996 Konrad
5,544,322 A 8/1996 Cheng et al.
5,550,984 A 8/1996 Gelb
5,557,516 A 9/1996 Hogan
5,557,518 A 9/1996 Rosen
5,557,798 A 9/1996 Skeen et al.
5,560,008 A 9/1996 Johnson et al. ..... 395/650
5,566,297 A 10/1996 Devarakonda et al.
5,577,209 A 11/1996 Boyle et al.
5,583,996 A 12/1996 Tsuchiya
5,590,197 A 12/1996 Chen et al.
5,592,378 A 1/1997 Cameron et al.
5,594,910 A 1/1997 Filepp et al.
5,596,642 A 1/1997 Davis et al.
5,596,643 A 1/1997 Davis et al.
5,604,802 A 2/1997 Holloway
5,619,648 A 4/1997 Canale et al.
5,621,797 A 4/1997 Rosen
5,623,547 A 4/1997 Jones et al.
5,623,656 A 4/1997 Lyons
5,642,419 A 6/1997 Rosen
5,664,110 A 9/1997 Green et al.
5,664,111 A 9/1997 Nahan et al.
5,675,507 A 10/1997 Bobo, II
5,694,551 A 12/1997 Doyle et al.
5,708,780 A 1/1998 Levergood et al.
5,710,884 A 1/1998 Dedrick
5,710,887 A 1/1998 Chelliah et al.
5,714,971 A 2/1998 Shalit et al.
5,715,314 A 2/1998 Payne et al.
5,721,832 A 2/1998 Westrope et al.
5,724,424 A 3/1998 Gifford
5,724,521 A 3/1998 Dedrick
5,727,164 A 3/1998 Kaye et al.
5,732,219 A 3/1998 Blumer et al.
5,734,719 A 3/1998 Tsevdos et al.
5,740,425 A 4/1998 Povilus
5,745,681 A 4/1998 Levine et al.
5,754,656 A 5/1998 Nishioka et al.
5,757,669 A 5/1998 Christie et al.
5,757,699 A 5/1998 Takeshima et al.
5,757,917 A 5/1998 Rose et al.
5,758,327 A 5/1998 Gardner et al.
5,760,771 A 6/1998 Blonder et al.
5,761,649 A 6/1998 Hill
5,761,662 A 6/1998 Dasan
5,768,142 A 6/1998 Jacobs
5,768,521 A 6/1998 Dedrick
5,774,670 A 6/1998 Montulli
5,784,565 A 7/1998 Lewine
5,790,793 A 8/1998 Higley
5,805,803 A 9/1998 Birrell et al.
5,806,077 A 9/1998 Wecker
5,812,776 A 9/1998 Gifford
5,826,241 A * 10/1998 Stein et al. ..... 705/26
5,826,242 A 10/1998 Montulli
5,848,399 A 12/1998 Burke
5,848,412 A 12/1998 Rowland et al.
5,848,413 A 12/1998 Wolff
5,862,325 A 1/1999 Reed et al.
5,870,552 A 2/1999 Dozier et al.
5,875,296 A 2/1999 Shi et al.
5,892,917 A 4/1999 Myerson
5,895,454 A 4/1999 Harrington
5,897,622 A 4/1999 Blinn et al.
5,908,469 A 6/1999 Botz et al.
5,909,492 A 6/1999 Payne et al.
5,920,847 A 7/1999 Kolling et al.
5,982,891 A 11/1999 Ginter et al.
6,006,018 A 12/1999 Burnett et al.
6,006,199 A 12/1999 Berlin et al.
6,016,520 A 1/2000 Facq et al.
6,023,683 A 2/2000 Johnson et al.
6,041,316 A 3/2000 Allen
6,049,785 A 4/2000 Gifford
6,119,151 A 9/2000 Cantrell
6,195,649 B1 2/2001 Gifford
6,199,051 B1 3/2001 Gifford
6,205,437 B1 3/2001 Gifford
6,249,291 B1 6/2001 Popp et al.
6,275,867 B1 8/2001 Bendert et al.
6,449,599 B1 9/2002 Payne et al.
6,708,157 B2 3/2004 Stefik et al.
7,272,639 B1 9/2007 Levergood et al.
2007/0192709 A1 8/2007 Popp et al.

FOREIGN PATENT DOCUMENTS

EP 0 456 920 1/1991
EP 0 542 298 5/1993
EP 0 645 688 3/1995
EP 718784 6/1996

| | | | |
|---|---|---|---|
| EP | 490980 | B1 | 5/1999 |
| GB | 2102606 | | 2/1983 |
| JP | 3278230 | | 12/1991 |
| JP | 4-10191 | | 1/1992 |
| JP | 05-158963 | | 6/1993 |
| JP | 5274275 | | 10/1993 |
| JP | 6162059 | | 6/1994 |
| JP | 6291776 | | 10/1994 |
| JP | 411098134 | | 4/1999 |
| JP | A 11-098134 | | 4/1999 |
| WO | WO 91/16691 | | 10/1991 |
| WO | WO 93/10503 | | 5/1993 |
| WO | WO 94/03859 | | 2/1994 |
| WO | WO 95/16971 | | 6/1995 |

OTHER PUBLICATIONS

Matt's Script Archive: HTTP Cookie Library Frquently Asked Questions (1995) pp. 1.*
Netscape Navigator "Browser History: Netscape" (1996) pp. 1-6.*
"n16e090.zip Mosaic Netscape" (http://panda.bg.univ.gda.pl/pub/win/16bit/net/netscape ).*
"Mozilla" (http://en.wikipedia.org/wiki/Mozilla).*
"Mosaic-hp700.Z" "MIT-Magic-Cookie" (ftp://ftp.ncsa.uiuc.edu/Mosaic/Unix/binaries/old/2.0" Jun. 27, 1994.*
"the netscape dorm." Jamie Zawinski (http://www.jwz.org/gruntle/nscpdorm.html) Jul. 1994.*
"Conversations with Entrepreneurs—Lee Stein" (http://www.hotelschool.cornell.edu/ihe//conversations/Istein.html, pp. 1 and 2.*
Marc Andreessen "Here it is, world!" Usenet News Group Posting Oct. 13, 1994, pp. 1.*
Michael D. "Netscape No More" in John Cole's Balloon Juice, p. 12, entry 49, Jan. 2008, pp. 1-24.*
Jill Mohler "Lotus LMS and Lotus Virtual Classroom evolve—Jan. 1, 1994", pp. 1-3, 2006.*
"D.T.'s History Chronology Sep. 1994!", pp. 1-4. Oct. 13, 2008.*
"Crossroads (R)—New Morning Daybook—Sep. 12, 2005", pp. 1-4, Sep. 15, 2005.*
Alexander Pershteyn, "Web Browsers", pp. 1-5, Oct. 25, 2008.*
"Netscape Analysis Report Accounting 2 Honors", pp. 1-4 Oct. 25, 2008.*
Andrew Tappenden & James Miller, "A Three-Tiered Testing Strategy for Cookies". pp. 1-10, 2008.*
"Workstations, UNIX, and the Net, 1981-1995", pp. 303, 2008.*
David M. Kristol, "HTTP Cookies: Standards, Privacy, and Politics", pp. 1-48, ACM Transactions on Internet Technology, vol. 1, No. 2, Nov. 2001.*
"n16e090.zip Mosaic Netscape" (http://panda.bg.univ.gda.pl/pub/win/16bit/net/netscape), undated.*
"Mozilla" (http://en.wikipedia.orglwiki/Mozilla, undated.*
"Conversations with Entrepreneurs—Lee Stein" (http://www.hotelschool.comell.edul/ihe/conversations/Istein.html, pp. 1 and 2, undated.*
Kesan, Jay P. et al., "Shaping Code", University of Illinois at Urbana-Champaign, College of Law and Institute of Government and Public Affairs, Aug. 2002, pp. 3-185.
Dave et al., "Proxies, Application Interfaces, and Distributed Systems", IEEE 1992, University of Illinois at Urbana-Champaign, Department of Computer Science, Urbana, IL, pp. 212-220.
Mogul, Jeffrey C, "The Case for Persistent-Connection HTTP", Computer Communication Review—Proceedings of ACM SIGCOMM'95, The SIGCOMM Quarterly Publication, Oct. 1995, vol. 25, No. 4, pp. 299-313, Cambridge, MA.
Padmanabhan, et al., "Improving HTTP Latency", Computer Networks and ISDN Systems, 1995, pp. 25-35, vol. 28, Elsevier Science B.V.
Russo, et al., "Distributed object interoperability via a network type system", Object Orientation in Operating Systems, 1992, Proceedings of the Second International Workshop On, Sep. 1992, Dourdan, France.
Andreessen, Marc; "Getting Started with NCSA Mosaic"; May 8, 1993; National Center for Supercomputing Applications, Software Development Group, Champaign, IL pp. 1-5.
Sherman, Xie Chunyan; "The Story of Cookie"; Jun. 18, 2003; pp. 1-5.
Wikipedia; "HTTP cookie—Wikipedia, the free encyclopedia"; Oct. 16, 2006, pp. 1-10.
Van Mane, M.L.; "Putting the lid on Pandora's cookie jar"; Aug. 19, 1996; PC Week magazine v. 13, No. 33, p. 8; Ziff-Davis Publishing Co.
Foster, E.; "Can mixing "cookies" with online marketing be a recipe for heartburn?"; Jul. 22, 1996; InfoWorld magazine v. 18, No. 30, p. 54; InfoWorld Publishing Company.
McCarthy, S.P.; "The Netscape Biscuit Company serves up a snack that knows you"; Sep. 23, 1996; Government Computer News magazine, v. 152, No. 24, p. 55(2); Cahners Publishing Associates.
Raynovich, R.S.; "Microsoft readies browser update"; Aug. 5, 1996; LAN Times v. 13, No. 17, p. 7; The McGraw-Hill Companies, Inc.
Netscape, "Persistent Client State HTTP Cookies"; retrieved from the Internet on Nov. 19, 1997 from webpage: http://home.netscape.com/newsref/std/cookiespec.html.
Montulli, L., et al.;; "Proposed HTTP State Management Mechanism"; Feb. 16, 1996; HTTP Working Group.
Kristol, D.M.; "Cookie I-D Drafts"; retrieved from the Internet on Nov. 24, 1997 from webpage: http://portal.research.bell-labs.com/.about.dmk/cookie-ver.html.
CMP Netguide magazine; "The Trouble With Cookies"; May 1, 1996; Issue 305, CMP Media.
Kristol, D.M.; "Proposed HTTP State-Info Mechanism"; Sep. 22, 1995; HTTP Working Group.
"Cookie I-D Drafts"; Nov. 21, 1997; http://portal.research.bell-labs.com/ dmk/cookie-ver.html.
Berners-Lee, Tim; webpage retrieved on Sep. 11, 2008: http://www.w2.org/People/Berners-Lee; 5 pages.
*Netscape Communications Corp.* vs. *ValueClick, Inc, Mediaplex, Inc., Fastclick, Inc., Commission Junction, Inc., MeziMedia, Inc., and Web Clients, LLC,* Filed Feb. 27, 2009 in the US District Court for the Eastern District of Virginia (Alexandria Division), Case No. 1:09 CV 225 TSE/IDD, Complaint for Patent Infringement, Exhibit A.
*ValueClick, Inc, Mediaplex, Inc., Commission Junction, Inc., MeziMedia, Inc. and Web Clients, LLC* vs. *Netscape Communications Corp.*, Filed Apr. 3, 2009 in the US District Court for the Central District of California, Case No. CV09-02352, Complaint for Declaratory Judgment, Exhibits A-C.
Ex Parte Reexamination Certificate, U.S. Patent No. 5,909,492 C1, issued Aug. 7, 2007, 12 pages.
Ex Parte Reexamination Certificate, U.S. Patent No. 5,715,314 C1, issued Oct. 9, 2007, 12 pages.
American National Standard: "Financial Institution Retail Message Authentication," ANSI X9.19, 1986, 40 pages.
American National Standard: "Interchange Message Specification for Debit and Credit Card Message Exchange Among Financial Institutions," ANSI-X9.2, 1988, 101 pages.
Anderson, Ross J. "UEPS—A Second Generation Electronic Wallet", 1992, Proceedings of the Second European Symposium on Research in Computer Security, pp. 411-418.
Trubey, Phil, "Protocol Proposal based on SNPP," e-mail dated Nov. 24, 1993, 7 pages.
Beutelspacher et al., "Payment Applications with Multifunctional Smart Cards," Smart Card 2000, 1989, pp. 95-101.
Booz, Allen & Hamilton, "How to Buy Information with a First Virtual Account," Apr. 11, 1994, 63 pages.
Bos, Jurjen, & Chaum, David, "SmartCash: a Practical Electronic Payment System", Aug. 1990, Centre for Mathematics and Computer Science, pp. 1-8.
Burk, Holger, & Pfitzmann, Andreas, "Digital Payment Systems Enabling Security and Unobservability," Computer & Security, 1989, pp. 399-415.
Burk, Holger, & Pfitzmann, Andreas, "Value Exchange Systems Enabling Security and Unobservability," Computer & Security, 1990, pp. 715-721.
Chaum et al., "Untraceable Electronic Cash," Aug. 1988, CRYPTO '88, 8$^{th}$ Annual International Cryptology Conference, Santa Barbara, CA USA, pp. 319-327.

Chaum, D.L., & Fabry, R.S., "Implementing Capability-Based Protection Using Encryption," Electronics Research Laboratory, University of California, Berkeley, Jul. 17, 1978, 12 pages.
Cohen, D., "Computerized Commerce," ISI Reprint Series IS/RS-89-243, Oct. 1989, Reprinted from Information Processing 89, Proceedings of the IFIP World Computer Congress, held Aug. 28-Sep. 1, 1989, 8 pages.
Cohen, D., "Electronic Commerce," University of Southern California Information Sciences Institute, Research Report ISI/RR-89-244, Oct. 1989, 42 pages.
Miscellaneous articles, Computer Shopper, Nov. 1994, pp. 180-182, 187, 190-192, 522-528, 532, 534 (21 pages).
"Consumers Plugging into New Electronic Mail", Advertising Age, Mar. 4, 1985, p. 74.
Damgard, Ivan Bjerre, "Payment Systems and Credential Mechanisms with Provable Security Against Abuse by Individuals (Extended Abstract)", Aug. 1988, CRYPTO '88, 8th Annual International Cryptology Conference, Santa Barbara, CA USA, pp. 328-336.
Davies, D.W. & Price, W.L., "Security for Computer Networks: An Introduction to Data Security in Teleprocessing and Electronic Funds Transfer", John Wiley & Sons © 1984, pp. 304-336.
Dukach, Semyou, "SNPP: A Simple Network Payment Protocol"; M.I.T. Laboratory for Computer Science: Cambridge, MA, accessed on Jan. 29, 1995, 7 pages.
Even et al., "Electronic Wallet"; 1984, Proceedings of CRYPTO '83, pp. 383-386.
Ferrarini, Elizabeth, "Direct Connections for Software Selections", Business Computer Systems, Feb. 1984, pp. 35, 37-38.
Fujioka, Atsushi, et al., "ESIGN: An Efficient Digital Signature Implementation for Smart Cards," Lecture Notes in Computer Science: Advances in Cryptology—Eurocrypt '91, Apr. 1991, pp. 446-450, 452-457.
Gifford, David & Spector, Alfred, "Case Study; The Cirrus Banking Network," Communications of the ACM, vol. 28, No. 3, Aug. 1985, 2 pages.
Gifford, David K., "Notes on Community Information Systems", MIT/LCS/TM-419, Dec. 10, 1989, 7 pages.
Gifford, David K, "Cryptographic Sealing for Information Secrecy and Authentication", Communications of the ACM, vol. 25, No. 4, Apr. 1982, pp. 274-286.
Hakola, Vern E. & Blumenthal, Sherman C., "A System for Automatic Value Exchange (Save)," AFIPS Conference Proceedings—1966 Fall Joint Computer Conference, Nov. 7-10, 1966, pp. 579-589.
Harty, Kieran & Ho, Linda, "Case Study: The VISA Transaction Processing System", May 30, 1988, pp. 1-23.
Hirschfeld, Rafael, "Making Electronic Refunds Safer", Laboratory for Computer Science, MIT, 1992, 4 pages.
Information Networking Institute, Carnegie Mellon University, "Internet Billing Server Prototype Scope Document INI Technical Report 1993-1," Oct. 14, 1993, 29 pages.
International Organization for Standardization, International Standard, "Bank Card Originated Messages—Interchange Message Specifications—Content for Financial Transactions," ISO 8583, 1987, 37 pages.
Intuit Corp. Quicken User's Guide, "Paying Bills Electronically", undated, pp. 171-191.
Jansson, Lennert, "General Electronic Payment System", 7th Proceedings of the International Conference on Computer Communication, 1985, pp. 832-835.
Kenny, Peter, "EDI Security: Risks and Solutions", SD-Scion UK Limited, 1992, 12 pages.
Krajewski, Jr., Marjan, "Concept for a Smart Card Kerberos", Oct. 1992, 15th National Computer Security Conference, vol. 1, 9 pages.
Krajewski, Jr., Marjan, et al., "Applicability of Smart Cards to Network User Authentication", Computing Systems, vol. 7, No. 1, Winter 1994, pp. 75-89.
Krajewski, Jr. Marjan, "Smart Card Augmentation of Kerberos", Feb. 1993, Proceedings of the Privacy and Research Groung Workshop on Network and System Security, pp. 119-123.
Lai, Charlie, et al., "Endorsements, Licensing, and Insurance for Distributed System Services", Information Sciences Institute, University of Southern California, Association for Computing Machinery, 1994, 6 pages.
Low, Steven, et al., "Anonymous Credit Cards", 1994, AT&T Bell Laboratories, pp. 1-16.
Medvinsky et al., "Electronic Currency for the Internet", Electronic Markets, Sep. 1993, pp. 30-31.
Messmer, Ellen, "NIST Stumbles on Proposal for Public-Key Encryption", Network World, Jul. 27, 1992, pp. 1-6.
Mosaic Communications Press Release, "Mosaic Communications Unveils Network Navigator and Server Software for the Internet", Sep. 12, 1994, 3 pages.
National Westminster Bank Group, "Clearing House Automated Payments System", undated, 30 pages.
Needham, Roger M., "Adding Capability Access to Conventional File Servers", 1979, Xerox Palo Alto Research Center, California, pp. 3-4.
Okamoto, Tatsuaki & Ohta, Kazuo, "Universal Electronic Cash", Aug. 1991, CRYPTO '91, pp. 324-337.
Perry, Tekla S., "Electronic Banking Goes to Market", IEEE Spectrum, Feb. 1988, pp. 46-49.
Pfitzmann, Birgit & Waidner, Michael, "How to Break and Repair a 'Provably Secure' Untraceable Payment System (Extended Abstract)", Aug. 1991, CRYPTO '91, pp. 338-350.
Philippe van Heurck, "TRASEC: Belgian Security Systems for Electronic Funds Transfers," Computers & Security, vol. 6, No. 3, Jun. 1987, pp. 261-268.
"Recommendation X.509: The Directory—Authentication framework," Fascicle VIII.8 (Melbourne, 1988) pp. 48-82.
Remery, P., et al., "Le paiement electronique", L'Echo des Recherches, No. 134, 1988, pp. 15-16, 18-24.
Rescorla E. & Schiffman, A., "The Secure HyperText Transfer Protocol", Enterprise Integration Technologies, Dec. 1994, 35 pages.
Rescorla E. & Schiffman, A., "The Secure HyperText Transfer Protocol", Enterprise Integration Technologies, Jun. 1994, 22 pages.
Rivest, R.L., et al., "A Method for Obtaining Digital Signatures and Public-Key Cryptosystems", Feb. 1978, Laboratory for Computer Science, MIT, pp. 1-15.
Schaumuller-Bichl, "IC Cards in High-Security Applications", 1987, Voest-Alpine AG, pp. 177-199.
Shain, M., "Security in Electronic Funds Transfer: Message Integrity in Money Transfer and Bond-Settlements through GE Information Services' Global Network", Computers & Security, vol. 8, No. 3, 1989, pp. 209-221.
Sirbu, Marvin A., "Internet Billing Service Design and Prototype Implementation", Jan. 1994, pp. 1-19.
Society for Worldwide Interbank Financial Telecommunication S.C., "S.W.I.F.T., A S.W.I.F.T. Overview: The Industry Standard for Linking Financial Institutions," undated, 33 pages.
Staskauskas, Mark G., "The Formal Specification and Design of a Distributed Electronic Funds-Transfer System", IEEE Transactions on Computers, vol. 37, No. 12, Dec. 1988, pp. 1515-1528.
Stol, Norvald, "Privacy Protected Payments—A Possible Structure for a Real Implementation and Some Resource Considerations", ELAB Sintef-Gruppen, Reproduced by U.S. Department of Commerce, Feb. 1988, 88 pages.
Strazewski, "Computerized Service Sets Shoppers Hacking", Advertising Age, Feb. 22, 1988, p. 62.
Takei, Daisuke, "Videotex Information System and Credit System Connecting with MARS-301-of JNR," Japanese Railway Engineering, No. 95, Sep. 1985, pp. 9-11.
Tanaka, Yoshiski, et al., "Untraceable Electronic Funds Transfer Systems", Electronics and Communications in Japan, Part 3, vol. 72, No. 9, 1989, pp. 47-54 (Translated from Denshi Joho Tsoshin Gakkai Ronbunshi, vol. 71-A, No. 6, Aug. 1988, pp. 1585-1591).
Tenenbaum, Jay M. & Schiffman, Allan M., "Development of Network Infrastructure and Services for Rapid Acquisition", Adapted from a White Paper Submitted to DARPA by MCC in Collaboration with EIT and ISI, Jan. 12, 1992, pp. 1-19.
Tunstall, John S., "Smart Card 2000: Electronic Currency," Aug. 1988, Lecture Notes in Computer Science: Advances in Cryptology—CRYPTO '88 Proceedings, pp. 47-48.
Vittal, John, "Active Message Processing: Messages as Messengers," 1981, pp. 175-195.

Waidner, Michael & Pfitzmann, Birgit, "Loss-Tolerance for Electronics Wallets", Fault-Tolerant Computing: 20th International Symposium, Jun. 26-28, 1990, pp. 140-147.
Weber, Ron, "Controls in Electronic Funds Transfer Systems: A Survey and Synthesis", Computers & Security, vol. 8, No. 2, 1989, pp. 123-137.
Kristol, D. & Montulli, L., "HTTP State Management Mechanism," RFC 2965, Oct. 2000, pp. 1-22, accessed at http://www.cse.ohio-state.edu/cgi-bin/rfc/rfc2965.html on Dec. 8, 2004.
"maX.500—a Macintosh X.500 Directory Client", Sep. 1997, accessed at http://www.umich.edu/~dirsvcs/Idap/max500/index.html on Nov. 30, 2004, pp. 1-3.
Netscape Support Documentation, "Persistent Client State HTTP Cookies: Preliminary Specification—Use With Caution," accessed at http://wp.netscape.com/newsref/std/cookie_spec.html on Dec. 8, 2004, pp. 1-5.
*Amazon.com, Inc.* v. *Barnesandnoble.com, Inc.,* 57 USPQ2D 1746, 1746-1763 (Fed. Cir. 2001).
Abadi, M., et al., "Authentication and Delegation with Smart-Cards," Chapter 67, Oct. 22, 1990, Revised Jul. 30, 1992, 30 pages.
Aho, A.V., et al., "The AWK Programming Language," AT&T Bell Labs., 1988, pp. 100-101.
Anderson, R., "Why Cryptosystems Fail," ACM, 1993, 13 pages.
Andrade, et al., "Open On-Line Transaction Processing with the TUXEDO® System," IEEE, 1992, 6 pages.
Bjorn N. Freeman-Benson, "Using the Web to Provide Private Information", 1994, 5 pages.
Bob Novick, "The Clickstream," Mar. 1995, accessed at http://www.i-m.com/archives/9503/0375.htm, on Mar. 22, 2003, 3 pages.
Bowman, et al., "Univers: An Attribute-Based Name Server," Software Practice and Experience, vol. 20(4), Apr. 1990, pp. 403-424.
Brian W. Kernighan & Dennis M. Ritchie, "The C Programming Language," 2d edition, Bell Telephone Laboratories, Inc., 1988, pp. 17-21.
Catledge L.D., "Characterizing Browsing Strategies in the World-Wide Web," accessed at http.www.igd.thg.de/archive/1995_.../UserPatterns.Paper4.formatted.htm on Feb. 8, 2001, 9 pages.
Chaum, D., "Achieving Electronic Privacy," Scientific American, Aug. 1992, pp. 96-101, accessed at http://www.chaum.com/articles/Achieving_Electronic_Privacy.htm on Dec. 2, 2004, 8 pages.
Cheriton D.R., & Mann, T.P., "Uniform Access to Distributed Name Interpretation in the V-System," IEEE, 1984, pp. 290-297.
Choudhury, Abhijit K., et al., "Copyright Protection for Electronic Publishing Over Computer Networks," IEEE Network, vol. 9, No. 3, May/Jun. 1995, pp. 12-20.
"Clickstream," accessed at http:www.wordspy.com/words/clickstream.asp on Mar. 22, 2003, 2 pages.
"American National Standard for Information Systems—Database Language SQL," American National Standards Institute, 1986, pp. 27-28.
Curtis, R., & Wittie, L., "Naming in Distributed Language Systems," IEEE, 1984, pp. 298-302.
Droms, R.E., "Access to Heterogenous Directory Services," IEEE, 1990, pp. 1054-1061.
Gary Welz, "The Media Business on the WWW," Proceedings of the Second World Wide Web Conference 1994: Mosaic and the Web, Oct. 1994, accessed at http://archive.ncsa.uiuc.edu/SDG/IT94/Proceedings/ComEc/welz/welzwwwconf.html on Dec. 8, 2004, 6 pages.
Gligor, V.D., & Lindsay, B.G., "Object Migration and Authentication," IEEE Transactions of Software Engineering, vol. SE-5, No. 6, Nov. 1979, pp. 607-611.
Good, B., "Experience with Bank of America's Distributive Computing System," IEEE, 1983, pp. 2-8.
Hitchens, M., & Rosenberg, J., "Bindings Between Names and Objects in a Persistent System," IEEE, 1992, pp. 26-37.
Housel, B.C., & Scopinich, C.J., "SNA Distribution Services," IBM Systems Journal, vol. 22, No. 4, 1983, pp. 319-343.
Inselberg, A., "An Approach to Successful Online Transaction Processing Applications," National Computer Conference, 1985, pp. 419-427.
Kahan, Jose, "A capability-based authorization model for the World-Wide Web," accessed at http://www.igd.fng.de/archive/1995_www95/proceedings/papers/86/CaMWWW.html on Jul. 19, 2004, 14 pages.
Kahan, Jose, "A Distributed Authorization Model for WWW," last updated May 5, 1995, accessed at http://www.isoc.org/HMP/PAPER/107/html/paper. 16 pages.
Kahan, Jose, "Un nouveau modele d-autorisation pour les systemes de consulation d-information multimedia repartee", Dec. 1994, pp. 45-57.
Kelley, A, and Pohl, I, "A Book on C," Benjamin/Cummings Publishing Company, Inc., 1984, pp. 35-36.
Kluchi, T, et al, "C-HTTP—The Development of a Secure, Closed HTTP-Based Network on the Internet," IEEE, 1996, pp. 64-75.
Lampson, B.W, "Designing a Global Name Service," ACM, 1986, 10 pages.
Lim, Jong-Gyun, "Using Coollists to Index HTML Documents in the Web," accessed at http://www.ncsa.uiuc.edu/SDG/TT94/Proceedings/Searching/lim/coolist.htm on Dec. 6, 2001, 8 pages.
Lou Montulli, "Re: Session tracking," posting on Internet message board, Apr. 18, 1995, 3 pages.
Menefee, C., "New Host for Internet Commercial Site Index," Newsbytes News Network, Nov. 9, 1994, 2 pages.
Metcalf, R.M. "Commercialization of the Internet Opens Gateways to Interpreneurs," Info World, Aug. 8, 1994, p. 44.
Michalski, J., "Content in context: the Future of SGML and HTML," EDventure Holdings, Inc., 1994, accessed at http://www.findarticles.com/p/articles/mi_mOREL/is_n9_v94/ai_16185267/print on Dec. 2, 2004, 10 pages.
"The New Redirect Directives," NCSA HTTPd Development Team, last modified Jul. 6, 1995, accessed at http://hoohoo.ncsa.uiuc.edu/docs/tutorials/howto/Redirect.html on Dec. 3, 2004, 2 pages.
Neuman, B.C., "Proxy-Based Authorization and Accounting for Distributed Systems," Proceedings on the 13th International Conference on Distributed Computing Systems, Pittsburg, May 1993, pp. 283-291.
Notkin, David, "Proxies: A Software Structure for Accommodating Heterogeneity," Software-Practice and Experience, vol. 20(4), Apr. 1990, pp. 357-364.
Ordille, J.J, & Miller, B.P., "Nomenclator Descriptive Query Optimization for Large X.500 Environments," ACM, 1991, pp. 185-196.
Peterson, Larry L, "A Yellow-Pages Service for a Local-Area Network," ACM, 1988, pp. 235-242.
Pitkow, J.E, & Krishna, A.B., "Webviz: A Tool for World-Wide Web Access Log Analysis", May 1994, In Proceedings of the First International WWW Conference, 7 pages.
Pitkow, J.E, & Recker, M.M., "Using the Web as a Survey Tool: Results from Second WWW User Survey",1994, accessed at http://www.igd.fhg.de/archive/1995_www95/papers/79/survey/survey_2_paper.html, on Dec. 8, 2004, 16 pages.
Ramanathan, S., & Rangan, P., "Architectures for Personalized Multimedia," IEEE Multimedia, 1994, pp. 37-46.
Rescorla, E, et al, "The Secure HyperText Transfer Protocol," Aug. 1999.
Rivest, R, "The MDS Message-Digest Algorithm," MIT Laboratory for Computer Science and RSA Data Security, Inc., Apr. 1992, 20 pages.
Schwartz, et al, "A Name Service for Evolving, Heterogeneous Systems," ACM, 1987, pp. 52-62.
Schwartz, M.F., & Tsirigotis, P., "Experience with a Semantically Cognizant Internet White Pages Directory Tool, Journal of Internetworking: Research and Experience," 1990, pp. 1-22.
Sedayao, J., "Mosaic Will Kill My Network!—Studying Network Traffic Patterns of Mosaic Use", Oct. 1994, accessed at http://www.ncsa.uiuc.edu/SDG/TT94/P...qs/DDay/sedayao/mos_traf_paper.htm on Feb. 6, 2001, 6 pages.
Sheltzer, et al, "Name Service Locality and Cache Design in a Distributed Operating System," 1986, University of California, Los Angeles, 8 pgs.
Squillante, M.C., & Notkin, D., "Integrating Heterogeneous Local Mail Systems," IEEE, Nov. 1989, pp. 59-67.
Terry, D.B., "Structure-free Name Management for Evolving Distributed Environments," IEEE, 1986, pp. 502-508.

Voydock, V., & Kent, S., "Security Mechanisms in High Level Network Protocols," Computing Surveys, vol. 15, No. 2, Jun. 1983, pp. 135-171.
Welch et al, "Prefix Tables: A Simple Mechanism for Locating Films in a Distributed System," IEEE, 1986, pp. 184-189.
WordPerfect for Macintosh, Wordperfect Corporation, 1990, pp. 153-162.
Zatti, et al, "Naming and Registration for IBM Distributed Systems," IBM Systems Journal, vol. 31, No. 2, 1992, pp. 353-380.
"Here it is, World" internet postings to comp. infosystems.www. users discussion list re: Mosaic Netscape, Oct. 13, 1994-Oct. 17, 1994, available at: http://groups.google.com/group/comp. infosystems.www.users/browse_thread/thread/3666fe4e21b3a9e2/ 9a210e5f72278328?Ink=st&rnum=5&h1=en#9a210e5f72278328, 11 pages.
"Netscape 0.93 Setup Questions" internet postings to comp. infosystems.www.misc discussion list re: Mosaic Netscape, Nov. 21, 1994-Nov. 25, 1994, 4 pages.
"Netscape and Cookies" internet postings to comp.infosystems.www.users discussion list, Dec. 11, 1994-Dec. 13, 1994, available at: http://groups.google.com/group/comp.infosystems.www.users/ browse_thread/thread/5347cb89bbae572b/3583cab5e6c13e94? Ink=St&rnum=3&h1=en#3583cab5e6c13e94, 2 pages.
"Cookies.txt file in Netscape" internet postings to comp.infosystems. www.users discussion list, Dec. 23, 1994-Dec. 27, 1994, available at: http://groups.google.com/group/comp.infosystems.www.users/ browse_thread/thread/613e81948e9cf6e4/ 134ade72dfclc58d?Ink=st&rnum=2&h1=en#134ade72dfcic58d, 2 pages.
"How to get stateful HTML documents" internet postings to comp. infosystems.www.misc discussion list, Jun. 24, 1994-Jun. 25, 1994, available at: http://groups.google.com/group/comp.infosystems. www.misc/browse_thread/threadfd304fedb645529a/ b8f6dab2aa73ae71?Ink=st&rnum=7&hl=en#b8f6dab2aa73ae71, 2 pages.
"How to add state infor to a form" internet postings to comp. infosystems.www.providers discussion list, Jun. 30, 1994-Jul. 1, 1994,available at: http://groups.google.com/group/comp.infosystems.www.providers/browse_thread/thread/2acad6cdc8ebb8a/ bf368e630add2c94?Ink=St&rnum=8&h1=en#bf368e630add2c94, 4 pages.
"Transactional Services on WWW" internet postings to comp. infosystems.www discussion list, May 21, 1994-Jun. 1, 1994, available at: http:/groups.google.com/group/comp.infosystems.www/ browse_thread/thread/bf430e6df8e6e7d/8ed77a97f5d0b96?Ink=st &h1=en#8ed77a97f5d0b9d6, 5 pages.
Dan Aronson, "access and session control" posting to www-talk discussion list,, Sep. 14, 1994, available at: http://1997.webhistory. org/www.lists/www-talk.1994q3/0901.html, 1 page.
Rick Troth, "access and session control" posting to www-talk discussion list, Sep. 15, 1994, available at: http://1997.webhistory.org/ www.lists/www-talk.1994q3/0923.html, 1 page.
alain@hyperman.co.il, "Identifying Mosaic session" posting to www-talk discussion list, Dec. 20, 1994, available at http://1997. webhistory.org/www.lists/www-talk.1994q4/1098.html, 1 page.
Joe English, "Re: Identifying Mosaic session", posting to www-talk discussion list, Dec. 20, 1994, available at: http://1997.webhistory. org/www.lists/www-talk.1994q4/1109.html, 2 pages.
Steven Majewski, "Identifying Mosaic session" posting to www-talk discussion list, Dec. 20, 1994, available at: http://1997.webhistory. org/www.lists/www-talk.1994q4/1111.html, 1 page.
Nick Arnett, "Statelessness" posting to www-talk discussion list, May 16, 1994, available at: http://1997.webhistory.org/www.lists/ www-talk.1994q2/0562.html, 2 pages.
Jared_Rhine@hmc.edu, "Statelessness" posting to www-talk discussion list, May 16, 1994, available at: http://1997.webhistory.org/ www.lists/www-talk.1994q2/0563.html, 2 pages.
Simon Spero, "Statelessness" posting to www-talk discussion list, May 17, 1994, available at: http://1997.webhistory.org/www.lists/ www-talk.1994q2/0579.html, 2 pages.
Jim McBeath, "Statelessness" posting to www-talk discussion list, May 27, 1994, available at: http://1997.webhistory.org/www.lists/ www-talk. 1994q2/0683.html, 1 page.
Philip Hallam-Baker, "Statelessness" posting to www-talk list, May 30, 1994, available at: http://1997.webhistory.org/www.lists/www-talk.1994q2/0705.html, 1 page.
Trewitt, Glenn, NCL Technical Note TN-14, "Using Tcl to Process HTML Forms," Digital Equipment Corporation, 1994, 48 pages.
Viescas, John L., The Official Guide to the Prodigy Service, Microsoft Press, 1991, ISBN 1-55615-374-0, 114 pages.
Bina et al., "Secure Access to Data Over the Internet", Sep. 1994, Proc. of the Third Int'l Conference on Parallel and Distributed Information Systems, pp. 99-102, Austin, TX, USA.
Farber, David, "Interesting-People Message—RSA/NCSA/EIT Announcement on Secure Mosaic [also see note at very end djf]," posting on Internet message board, Apr. 15, 1994, 4 pages.
Stephen T. Kent, "Internet Privacy Enhanced Mail," 8070 Communications of the ACM, New York, Aug. 1993, pp. 48-60.
Dan Kohn, "Prior Art on Open Market Patents," posting on Internet message board, Mar. 9, 1998, 1 page.
Peter H. Lewis, "Attention Shoppers: Internet is Open," New York Times, Aug. 12, 1994, 6 pages.
Medvinsky, G., & Neuman, B., "NetCash: A Design for Practical Electronic Currency on the Internet," Information Sciences Institute. University of Southern California, 1993, pp. 102-106.
Schaefer, L., & McKenney, B., "Networked Information Discovery and Retrieval Tools: Security Capabilities and Needs," The MITRE Corporation, 1994, pp. 145-153.
Gifford, D. et al., "Payment Switches for Open Networks," IEEE, 1995, pp. 26-31.
Berners-Lee, T., et al., "Uniform Resource Locators (URL)," Network Working Group memorandum, Dec. 2004, 24 pages, 4 pages.
"Changes to wwwStat," Regents of the University of California, 1996, accessed at http://ftp.ics.uci.edu/pub/websoft/wwwstat/ Changes on May 18, 2005, 4 pages.
Berners-Lee, T., "RFC 1630—Universal Resource Identifiers in WWW: A Unifying Syntax for the Expression of Names and Addresses of Objects on the Network as used in the World-Wide Web," Jun. 1994, accessed at http://www.faqs.org/rfcs/rfc1630.html on May 18, 2005, 23 pages.
Berners-Lee, T., et al., "RFC 1738—Uniform Resource Locators," Dec. 1994, accessed at http://www.faqs.org/rfcs/rfc1630.html on May 18, 2005, 20 pages.
Fielding, R., "RFC 1808: Relative Uniform Resource Locators," Jun. 1995, accessed at http://www.faqs.org/rfcs/rfc1808.html on May 18, 2005, 13 pages.
Berners-Lee, T., et al., "RFC 1945—Hypertext Transfer Protocol—HTTP/1.0," May 1996, accessed at http://www.faqs.org/rfcs/ rfc1945.html on May 18, 2005, 48 pages.
Fielding, R., et al., "RFC 2608—Hypertext Transfer Protocol—HTTP/1.1," Jan. 1997, accessed at http://www.faqs.org/rfcs/rfc2068. html on May 18, 2005, 127 pages.
Fielding, R., et al., "RFC 2616—Hypertext Transfer Protocol—HTTP/1.1," Jun. 1999, accessed at http://www.faqs.org/rfcs/rfc2616. html on May 18, 2005, 140 pages.
Tim Berners-Lee, "draft-ietf-iiir-http-00.txt," Nov. 5, 1993, 28 pages.
"wwwstat Distribution, Apr. 24, 1994 README," Apr. 1994, © 1994 Regents of the University of California, 9 pages.
"Upgrading NCSA HTTPd", last modified Aug. 1995, accessed at http://hoohoo.ncsa.uiuc.edu/docs/Upgrade.html on May 18, 2005, 11 pages.
Glenn Crocker, "web2mush: Serving Interactive Resources to the Web", Oct. 1994, Second Int'l World Wide Web Conference, Chicago, Illinois, USA, accessed at http://archive.ncsa.uius.edu/SDG/ IT94/Proceedings/DDay/crocker/tech.html on Mar. 14, 2005.
Richard Batelaan et al., "An Internet Billing Server Prototype Design," Carnegie Mellon University Information Networking Institute, Aug. 10, 1992, 101 pages.
O'Mahony, D. et al., "Electronic Payment Systems," Artech House, Inc., 1997, pp. 145-155.
Maren, Michael, "The Age of E-Mail," Home Office Computing, vol. 11, No. 12, Dec. 1993, 6 pages.
David Foster & Stuart Finn, "Insurers Can Benefit From E-Mail Networks," National Underwriter Property & Casualty-Risk & Benefits Management, No. 9, Mar. 4, 1991, 3 pages.

Elizabeth Ferrarini, "Flight of Fancy: Goodbye Travel Agent", Business Computer Systems, vol. 2, No. 11, Nov. 1983, 5 pages.
"'Cookies' (client-side persistent information) and their use," Netscape Technical Note 20019, Netscape Communications Corp., Oct. 1995, accessed at http://www.rent-a-cart.com/tech/ref1.html on Jul. 25, 2001, 2 pages.
Exhibit of emails relating to "wwworder" mailing list, dated May 31, 1994 to Jun. 28, 1994, 26 pages.
Uffe Kock Wiil & John J. Leggett, "Hyperform: Using Extensibility to Develop Dynamic, Open and Distributed Hypertext Systems," ACM, 1992, pp. 251-261.
Michael Bieber, "Issues in Modeling a 'Dynamic' Hypertext Interface for Non-Hypertext Systems," Hypertext '91 Proceedings, Dec. 1991, pp. 203-217.
Jacob Nielson, *Hypertext & Hypermedia,* Academic Press, Inc., 1990, pp. 49-58.
"Announcing: Internet Shopkeeper," posting on misc.forsale Internet newsgroup, Aug. 2, 1994, 4 pages.
Eaasy Sabre Reference Guide, undated, 12 pages.
CompuServe Manual, undated, 12 pages.
Roy T. Fielding & Richard N. Taylor, "Principled Design of the Modern Web Architecture," *ACM Transactions on Internet Technology,* vol. 2, No. 2, May 2002, pp. 115-150.
Smithson, Brian, and Singer, Barbara, "An Information Clearinghouse Server for Industry Consortia, Presented at the Fall 1994 World Wide Web Conference—Chicago, IL," accessed at http://archive.ncsa.uiuc.edu/SDG/IT94/Proceedings/CorInfSys/smithson/smithson.html on Apr. 29, 2005, 9 pages.
"What's New, Feb. 1994," Feb. 1994, 17 pages.
Business Wire, "CommerceNet Urges Government to Ease Export Restrictions on Encryption Products: Consortium's New White Paper Articulates Position on the Export of Cryptography-Based Products," Jun. 26, 1995, 2 pages.
New Release, "Advanced Electronic Credit Authorization Through the Amherst Group, SNET," New Haven, CT, Dec. 7, 1987, 2 pages.
Scot Anderson & Rick Garvin, "Sessioneer: Flexible Session Level Authentication With Off the Shelf Servers and Clients", Apr. 1995, WWW '95, accessed at at http//www.igd.fhg.de/archive/1995_www95/papers/77/sessioneer2.html on Mar. 1, 2000, 7 pages.
E. Loren Buhle, Jr., "Wide Area Information Servers," Digital Systems Journal, Sep./Oct. 1994, pp. 13-16.
Comer, Douglas, & Murtagh, Thomas, "The Tilde File Naming Scheme," The 6th International Conference on Distributed Computing Systems, IEEE Computer Society, Cambridge, MA, May 1996, pp. 509-514.
Comer, D, & Peterson, L., "A Model of Name Resolution in Distributed Systems," 1996, pp. 523-530.
"Underlying Security Mechanisms," Computer Fraud & Security Bulletin, Mar. 1992, 2 pages.
"Cookies and Privacy FAQ," accessed at http://search.netscape.com/assist/security/faqs/cookies.html on Jan. 9, 1998, 3 pages.
Phillips, K., "SuperHighway Access Eases Internet Entry," PC Week, Oct. 31, 1994, 3 pages.
Poler, Ariel, "Improving WWW Marketing Through User Information and Non-Intrusive Communications," accessed at http://archive.ncsa.uiuc.edu/SDG/IT94/Proceedings/Security/poler/poler.html on Mar. 14, 2005, 4 pages.
"It 'Will' happen," excerpt from infoHighway, accessed at http://web.archive.org/web/19990422224206/www.infohighway.co.uk/info-higha... on Aug. 24, 2004, 2 pages.
"Access and session control," multiple postings on Internet message boards, dated Sep. 14-15, 1994, 4 pages.
Derier, Christian, "The World-Wide Web Gateway to Hyper-G: Using a Connectionless Protocol to Access Session-Oriented Services," Institut fur Informationverarbeitung and Computergestiitzte neue Medien, Graz, Austria, Mar. 1995, 106 pages.
"wwwstat—HTTPd Logfile Analysis Software" homepage at http://www.ics.uci.edu/WebSoft/wwwstat/, last modified on May 13, 1998, 3 pages (archived on Mar. 1, 2000, at http://www.archive.org).
English, Joe, "Re: Identifying Mosaic session," posting on Internet message board, Dec. 20, 1994, 2 pages.
Hall, Devra, et al., "Build a Web Site: The Programmer's Guide to Creating, Building, and Maintaining a Web Presence", 1995, ISBN 0-7615-0064-2, 738 pages.
Hughes, Kevin, source code file, "getstats v1.0," Feb. 1, 1994, 64 pages.
McCartney, Todd, "Rhythm of The Pridelands Info," posting on Internet Newsgroup rec.arts.disney, Nov. 21, 1994, 1 page.
Pitkow, James, & Recker, Margaret, "Results from the First World Wide Web Use Survey", Nov. 1994, Journal of Computer Networks and ISDN Systems, vol. 27, No. 2, 15 pages.
"NetMarket: PGP Help," The NetMarket Company, 1994, 3 pages.
"CompuServe Videotex Network Offers Marketing Research Service, ad Test," Marketing News, Nov. 25, 1983, p. 21 (2 pages).
"Electronic In-Home Shopping: 'Our Stores are Always Open,'" Chain Store Age Executive, Mar. 1985, 2 pages.
"Mall Offers a Holiday Treat for Hackers", Nov. 1985, Advertising Age, 1 page.
Kuzela, Lad, "Redcoats Join Communications Fight", Feb. 1982, Industry Week, pp. 108-109.
"Suddenly, Video Tex is Finding an Audience," Business Week, Oct. 19, 1987, pp. 92, 94.
"Taking Advantage of the Past," Advertising Age, Apr. 11, 1983, 1 page.
Knapskog, S., "Privacy Protected Payments—Realization of a Protocol That Guarantees Payer Anonymity," Advances in Cryptology - EUROCRYPT '88, 1988, pp. 107-122.
Steve Higgins, "For Advertisers, Tapping Into On-Line Services Is Harder Than It Looks," Investor's Business Daily, p. 4, Apr. 7, 1994, 2 pages.
Montulli, Lou et al.; e-mail correspondence between members of HTTP Working Group ("hppt-wg"), "Subject: cookies patent"; Feb. 4-6, 2000; 6 pages.
Kristol, David and Montulli, Lou.; e-mail correspondence between Lou Montulli and David Kristol; "Subject: which release first had cookies?"; Apr. 9, 2001; 3 pages.
Netscape's First Amended Complaint (Dkt. 71), filed May 19, 2009, 8 pages.
ValueClick and FastClick's Answer, Defenses, and Counterclaims w/ Exhs. A-D (Dkt. 72), filed May 20, 2009, 64 pages.
ValueClick and FastClick's Answers to First Amended Complaint w/ Exhs. A-D (Dkt. 85), filed May 29, 2009, 68 pages.
Commission Junction, Mediaplex, MeziMedia, and Web Client's Answer, Defenses, and Counterclaims to First Amended Complaint w/ Exhs. A-D (Dkt. 129), filed Jul. 13, 2009, 131 pages.
Defendants' Initial Markman Brief w/ Exhs. 1-4 (Dkt. 136), filed Jul. 16, 2009, 143 pages.
Netscape's Opening Claim Construction Brief w/ Exhs. A-J (Dkt. 137), filed Jul. 16, 2009, 143 pages.
Commission Junction, Mediaplex, MeziMedia, and Web Client's Answer, Defenses, and Counterclaims to First Amended Complaint w/ Exhs. A-D (Dkt. 146), filed Jul. 23, 2009, 79 pages.
Defendants' Reply to Plaintiffs Opening Claim Construction Brief w/ Exhs. A-B, D-E (Dkt. 164), filed Jul. 30, 2009, 66 pages.
Netscape's Rebuttal Claim Construction Brief w/ Exhs. A-D (Dkt. 165), filed Jul. 30, 2009, 246 pages.
ValueClick and FastClick's First Amended Answer w/ Exhs. A-D (Dkt. 168), filed Jul. 31, 2009, 76 pages.
Memorandum in Support of Defendants' Motion for Summary Judgment (Redacted) (Dkt. 210), filed Sep. 4, 2009, 49 pages.
Decl. of Sheila M. Costin in Support of Defendants' Motion for Summary Judgment w/ Exhs. 3, 9, 13-14, 16-18, 20, 22, 23 (Dkt. 211), filed Sep. 4, 2009, 279 pages.
Netscape's Motion for Summary Judgment w/ Exhs. 5, 30-31, 36 (Dkt. 214), filed Sep. 4, 2009, 154 pages.
Defendants' Opposition to Netscape's Motion of Summary Judgment w/ Exhs. 11, 22, 27-28 (Dkt. 231), filed Sep. 16, 2009, 81 pages.
Netscape's Opposition to Defendants' Motion of Summary Judgment (Redacted) w/ Exhs. 10, 24 (Dkt. 234), filed Sep. 16, 2009, 60 pages.
Defendants' Reply to Netscape's Motion for Partial Judgment (Redacted) (Dkt. 247), filed Sep. 22, 2009, 38 pages.
Netscape's Reply to Defendants' Motion for Summary Judgment (Dkt. 248), filed Sep. 23, 2009, 38 pages.

Memorandum Opinion Regarding Claim Construction (Dkt. 271), issued Oct. 22, 2009, 33 pages.
Order Regarding Claim Construction (Dkt. 272), issued Oct. 22, 2009, 2 pages.
Defendants' Revised Supplemental Summary Judgment Submission Regarding Invalidity under 35 U.S.C. §§ 102 (b) and/or 103 w/ Exhs. A-C (Dkt. 289), filed Jan. 5, 2010, 29 pages.
Netscape's Corrected List of Citations to Record Evidence Regarding Cross-Motions for Summary Judgment for the Alleged On-Sale Bar (Dkt. 290), filed Jan. 11, 2010, 8 pages.
Order Regarding Summary Judgment (Dkt. 293), issued Jan. 29, 2010, 3 pages.
Memorandum Opinion Regarding Summary Judgment (Dkt. 294), issued Jan. 29, 2010, 49 pages.
Netscape's Supplemental Memorandum in Support of Motion for Partial Summary Judgment on Defendants' Invalidity Defenses (Dkt. 295), filed Feb. 3, 2010, 12 pages.
Defendants' Corrected Response to Plaintiffs Supplemental Memorandum in Support of Motion for Partial Summary Judgment w/ Exh. 1 (Dkt. 297), filed Feb. 10, 2010, 26 pages.
Netscape's Memorandum in Support of Its Motion to Reconsider Grant of Summary Judgment of On-Sale Bar for Claim 1 (Dkt. 313), filed Feb. 18, 2010, 31 pages.
Defendants' Opposition to Plaintiffs Motion to Reconsider re On-Sale Bar w/ Exh. A (Dkt. 320), filed Mar. 9, 2010, 28 pages.
Netscape's Reply in Support of Its Motion to Reconsider Grant of Summary Judgment of On-Sale Bar for Claim 1 (Dkt. 321), filed Mar. 12, 2010, 27 pages.
Memorandum Opinion Regarding Netscape's Motion to Reconsider Grant of Summary Judgment of On-Sale Bar for Claim 1 (Dkt. 327), filed Apr. 2, 2010, 41 pages.
Netscape's Motions in Limine (Dkt. 351), filed Apr. 9, 2010, 28 pages.
Defendants' Identification of Prior Art Pursuant to 35 U.S.C. § 282 (Dkt. 353), filed Apr. 9, 2010, 25 pages.
Defendants' Opposition to Plaintiffs Motion in Limine No. 6 Evidence of the Trewitt Invention w/ Exhs. A-I (Dkt. 369), filed Apr. 14, 2010, 62 pages.
Defendants' Opposition to Netscape's Motion in Limine No. 7 re Open Market code w/ Exh. A (Dkt. 375), filed Apr. 14, 2010, 9 pages.
Memorandum Opinion Regarding Summary Judgment (Dkt. 383), filed Apr. 14, 2010, 24 pages.
Netscape's Motion for Leave to File Reply to Defendants' Opposition to Motions in Limine w/ Exhs. 1, A-B (Dkt. 385), filed Apr. 15, 2010, 23 pages.
Order Regarding Netscape's Motion to Reconsider Grant of Summary Judgment of On-Sale Bar for Claim 1 (Dkt. 387), issued Apr. 16, 2010, 1 page.
Order Regarding Summary Judgment (Dkt. 387), issued Apr. 16, 2010, 2 pages.
Defendants' Amended Identification of Prior Art Pursuant to 35 U.S.C. § 282 (Dkt. 396), filed Apr. 21, 2010, 9 pages.
Order Regarding Netscape's and Defendants' Motions in Limine (Dkt. 408), issued Apr. 16, 2010, 4 pages.
Stipulated Motion for Dismissal with Prejudice (Dkt. 439), filed May 6, 2010, 4 pages.
Order of Dismissal with Prejudice of All Claims and Counterclaims (Dkt. 400), issued May 6, 2010, 1 page.
Videotaped deposition of Jeffrey Hoffman, Aug. 14, 2009, w/Exhs. 1-3, 63 pages.
Videotaped deposition of Kevin Jeffay (Redacted), Aug. 27, 2009, w/Exhs. 1-10, 878 pages. (Filed in 3 Parts).
Videotaped deposition of Bjorn Freeman-Benson, Aug. 28, 2009, w/Exhs. 1-2, 33 pages.
Expert Report of Klensin, Jul. 6, 2009, w/Exhs. A-Bg, 273 pages.
Expert Report of Scholl, Jul. 6, 2009, w/Exhs. A-D, 52 pages.
Supplemental Combined Declaration and Expert Report of Klensin, Aug. 14, 2009, w/Exhs. 1-8, 219 pages.
Supplemental Expert Report of Scholl, Aug. 14, 2009, w/Exhs. A-B, 32 pages.
Second Supplemental Expert Report of Klensin, Apr. 7, 2010, 24 pages.
Expert Report of Aoki, Aug. 14, 2009, w/Exhs. A1-B2, 18 pages.
Expert Report of Jeffay, Aug. 14, 2009, w/Exh. A, 48 pages.
Expert Report of Jeffay, Aug. 21, 2009 (Redacted), w/Exhs. A-B, Attach. 1, 241 pages.
Netscape's Supplemental Responses to ValueClick's First and Second Interrogatories (Redacted), Nov. 23, 2009, Response Nos. 1-3, 5, 10, 13, 19 pages.
Netscape's Objections and Supplemental Responses to Fastclick's First Interrogatories (Redacted), Nov. 23, 2009, Response Nos. 4-7, 16 pages.
Netscape's Responses to ValueClick's First Set of Interrogatories Related to Jurisdictional Discovery, May 25, 2009, Response No. 1 and Exhibits A & B, 18 pages.
ValueClick and Fastclick's Fourth Amended and Supplemental Responses to First and Second Interrogatories (Redacted), Oct. 23, 2009, Response No. 5, 8 pages.
ValueClick and Fastclick's Supplemental Preliminary Invalidity and Non-Infringement Disclosures (Redacted), Jul. 24, 2009, w/ Exhs. A-E, 656 pages.
ValueClick and Fastclick's Second Supplemental Preliminary Invalidity and Non-Infringement Disclosures, Aug. 26, 2009, w/ Exhs. A-B, 55 pages.
Sep. 25, 2009, Hearing Transcript, *Netscape Communications Corp. v. ValueClick, Inc., et al.,* No. 1:09-cv-225; dated Sep. 28, 2009, 102 pages.
Oct. 16, 2009, Hearing Transcript, *Netscape Communications Corp. v. ValueClick, Inc., et al.,* No. 1:09-cv-225, dated Oct. 23, 2009, 104 pages.
Dec. 18, 2009, Hearing Transcript, *Netscape Communications Corp. v. ValueClick, Inc., et al.,* No. 1:09-cv-225, 54 pages.
Jan. 29, 2010, Hearing Transcript, *Netscape Communications Corp. v. ValueClick, Inc., et al.,* No. 1:09-cv-225, 41 pages.
Apr. 16, 2010, Hearing Transcript, *Netscape Communications Corp. v. ValueClick, Inc., et al.,* No. 1:09-cv225, dated Apr. 20, 2010, 136 pages.
Agreed Protective Order, w/Attchmt A (Dkt. 95), filed Jun. 11, 2009, 28 pages.
Memorandum in Support of Defendants' Motion for Summary Judgment (Filed Under Seal) w/Exhs. 1-3 (Filed Under Seal) (Dkt. 210), filed Sep. 4, 2009, 85 pages.
Decl. of Sheila M. Costin in Support of Defendants' Motion for Summary Judgment w/Exhs. 3, 4-8 (Filed Under Seal), 9, 10-12 (Filed Under Seal), 13-14, 15 (Filed Under Seal), 16-18, 19 (Filed Under Seal), 20, 21 (Filed Under Seal), 22-23, 61 (Filed Under Seal), 66-67 (Filed Under Seal), 77 (Filed Under Seal) (Dkt. 211), filed Sep. 4, 2009, 551 pages.
Netscape's Motion for Summary Judgment w/Exhs. 1-4 (Filed Under Seal), 5, 6-7 (Filed Under Seal), 9-11 (Filed Under Seal), 20 (Filed Under Seal), 30-31, 32 (Filed Under Seal), 36, 37-39 (Filed Under Seal), 41-47 (Filed Under Seal), 49-55 (Filed Under Seal) (Dkt. 214), filed Sep. 4, 2009, 789 pages.
Defendants' Opposition to Netscape's Motion of Summary Judgment w/Exhs. 1-2 (Filed Under Seal), 10 (Filed Under Seal), 11, 12 (Filed Under Seal), 14-20 (Filed Under Seal), 22, 24-26 (Filed Under Seal), 27-28 (Dkt. 231), filed Sep. 16, 2009, 505 pages.
Netscape's Opposition to Defendants' Motion of Summary Judgment (Filed Under Seal) w/Exhs. 1-3 (Filed Under Seal), 10, 24 (Dkt. 234), filed Sep. 16, 2009, 108 pages.
Defendants' Reply to Netscape's Motion for Partial Judgment (Filed Under Seal) w/Exhs. 3 (Filed Under Seal), 5 (Filed Under Seal), 14-15 (Filed Under Seal) (Dkt. 247), filed Sep. 22, 2009, 85 pages.
Netscape's Reply to Defendants' Motion for Summary Judgment w/Exh. 2 (Filed Under Seal) (Dkt. 248), filed Sep. 23, 2009, 46 pages.
Defendants' Corrected Response to Plaintiffs Supplemental Memorandum in Support of Motion for Partial Summary Judgment w/Exhs. 1, 2 (Filed Under Seal) (Redacted), 9 (Filed Under Seal) (Dkt. 297), filed Feb. 10, 2010, 38 pages.
Defendants' Motion for Leave to Supplement Expert Reports & Exhibits w/Exhs. A, B (Filed Under Seal), C, D (Filed Under Seal) (Dkt. 331), filed Apr. 9, 2010, 78 pages.
Netscape's Motions in Limine w/Exhs. 1-6 (Filed Under Seal), 8-10 (Filed Under Seal), 11 (Filed Under Seal) (Redacted), 13-14 (Filed Under Seal) (Dkt. 351), filed Apr. 9, 2010, 290 pages.

Videotaped deposition of John Giannandrea, Jun. 17, 2009, w/Exhs. 1-17, 265 pages.
Videotaped deposition of Marc Andreessen, Jun. 27, 2009 (Confidential—Attorneys' Eyes Only), w/Exhs. 1-18, 630 pages.
Videotaped deposition of Lou Montulli, Jun. 30, 2009, w/Exhs. 1-16, 261 pages.
Videotaped deposition of Edwin Aoki, Jul. 1, 2009, w/Exhs. 1-5, 134 pages.
Videotaped deposition of Vinton Cerf, Jul. 10, 2009, w/Exhs. 1-7, 205 pages.
Videotaped deposition of James Sha, Jul. 28, 2009 (Confidential), w/Exhs. 1-11, 544 pages.
Videotaped deposition of Jamie Zawinski, Aug. 4, 2009, w/Exhs. 1-32, 390 pages.
Videotaped deposition of James Clark, Aug. 13, 2009 (Confidential), w/Exhs. 1-19, 1507 pages.
Videotaped deposition of Michael Mael, Aug. 14, 2009 (Privileged and Confidential—Pursuant to Protective Order), w/Exhs. 1-10, 645 pages.
Videotaped deposition of John Klensin, Aug. 18, 2009 (Confidential—Attorneys' Eyes Only), w/Exhs. 1-17, 1094 pages.
Videotaped deposition of Norihiro Edwin Aoki, Aug. 21, 2009, w/Exhs. 1-2, 96 pages.
Videotaped deposition of Ernest Johnson, Aug. 27, 2009 (Confidential) (Redacted), w/Exhs. 1-6, 251 pages.
Videotaped deposition of James McBeath, Aug. 12, 2009, w/Exhs. 1-3, 4 (screen shots), 5, 58 pages.
CD-ROM copy of Exh. 4 of deposition of James McBeath, Aug. 12, 2009.
Videotaped deposition of Frederick Scholl, Aug. 28, 2009 (Confidential), w/Exhs. 1-7, 335 pages.
Videotaped deposition of Glenn Trewitt, Aug. 21, 2009, w/Exhs. 1-3, 4A (screen shots), 4B (screen shots), 5-13 & A-C, 956 pages.
CD-ROM copy of Exh. 4A of deposition of Glenn Trewitt, Aug. 21, 2009.
CD-ROM copy of Exh. 4B of deposition of Glenn Trewitt, Aug. 21, 2009.
Videotaped deposition of Judson Valeski, Sep. 10, 2009 (Confidential—Attorneys' Eyes Only), w/Exhs. 1-4, 243 pages.
Expert Report of Johnson, Jul. 6, 2009, w/Exhs. A-C, 141 pages.
Supplemental Expert Report of Johnson (Redacted), Aug. 14, 2009, w/Exhs. A-J, 535 pages.
Second Supplemental Expert Report of Johnson, Apr. 7, 2010 (Restricted—Highly Confidential, Subject to Prosecution Bar) (Redacted), w/Exhs. A-D, 38 pages.
Expert Report of Valeski, Aug. 14, 2009, w/Exhs. A-D, 47 pages.
Expert Report of Valeski, Aug. 28, 2009 (Restricted—Highly Confidential, Subject to Prosecution Bar), w/Exhs. E-I, 26 pages.
ValueClick and Fastclick's Fourth Amended and Supplemental Responses to First and Second Interrogatories, Oct. 23, 2009, Response Nos. 5, 9 pages.
ValueClick's Notice of Deposition and Subpoena Duces Tecum to Soverain Software LLC, 13 pages.
Declaration of Katharine A. Wolanyk, Jul. 9, 2009 (Redacted), 5 pages.
Supplemental Declaration of Katharine A. Wolanyk, Apr. 30, 2010 (Exhibit 1 omitted), 2 pages.
ValueClick's Identification of Prior Art Pursuant to 35 U.S.C. § 282 (Dkt. 353), filed Apr. 9, 2010, 25 pages.
ValueClick's Amended Identification of Prior Art Pursuant to 35 U.S.C. § 282 (Dkt. 396), filed Apr. 21, 2010, 9 pages.
Andreessen - Batelle interview transcript, date unknown, VC.0019017-20, 4 pages.
Robert H. Reid, Architects of the Web: 1,000 Days that Built the Future of Business (John Wiley & Sons, Inc. 1997), NETSCAPE00034829-939, Part 1 of 3, pp. 1-37.
Robert H. Reid, Architects of the Web: 1,000 Days that Built the Future of Business (John Wiley & Sons, Inc. 1997), NETSCAPE00034829-939, Part 2 of 3, pp. 38-75.
Robert H. Reid, Architects of the Web: 1,000 Days that Built the Future of Business (John Wiley & Sons, Inc. 1997), NETSCAPE00034829-939, Part 3of 3, pp. 76-111.
Marc Andreessen, "Getting Started with NCSA Mosaic," May 8, 1993, pp. 1-3, VC.0001343-45, 3 pages.
Tim Berners-Lee, "Hypertext Transfer Protocol: A Stateless Search, Retrieve and Manipulation Protocol," Hypertext Transfer Protocol, Internet Draft, Nov. 5, 1993, pp. 1-25, VC.0020527-551, 25 pages.
Linda Mui, "Improving X Windows Security," UnixWorld, Dec. 1992, pp. 115-116, VC.2809114-120, 7 pages.
S.P. Miller, et al., "Kerberos Authentication and Authorization System," Project Athena Technical Plan, Section E.2.11, Oct. 27, 1988, pp. VC.0020034-69, 36 pages.
B. Clifford Neuman and Theodore Ts'o, "Kerberos: An Authentication Service for Computer Networks," IEEE Communications Magazine, Sep. 1994, vol. 32, No. 9, pp. 33-38, VC.2809104-110, 7 pages.
Dave Mathews, "Marc Andreessen Charts the Browser's Evolution," PCMag.com, Apr. 28, 2008, VC.0020196-97, 2 pages.
David K. Allison, "Marc Andreessen Oral History Computerworld Honors Program International Archives, Transcript of a Video History Interview with Marc Andreessen," Jun. 1995, pp. 1-24, VC.0018993-9016, 24 pages.
Marc Andreessen, "NCSA Mosaic Technical Summary," NCSA Mosaic Technical Summary 2.1, May 8, 1993, pp. 1-5, VC.0001347-51, 5 pages.
Netscape Communications News Release, "MCI Selects Netscape Communications' Secure Software for New InternetMCI Service," Nov. 21, 1994, NETSCAPE00013291-92, 2 pages.
Jim Clark, Netscape Time: The Making of the Billion Dollar Start-Up that Took on Microsoft (St. Martin's Griffin 1999, First St. Martin's Griffin Ed. Jun. 2000), NETSCAPE00116243-521, part 1 of 3, pp. 1-74.
Jim Clark, Netscape Time: The Making of the Billion Dollar Start-Up that Took on Microsoft (St. Martin's Griffin 1999, First St. Martin's Griffin Ed. Jun. 2000), NETSCAPE00116243-521, part 2 of 3, pp. 75-193.
Jim Clark, Netscape Time: The Making of the Billion Dollar Start-Up that Took on Microsoft (St. Martin's Griffin 1999, First St. Martin's Griffin Ed. Jun. 2000), NETSCAPE00116243-521, part 3 of 3, pp. 194-276.
Koen Holtman, "Non-Persistent Cookie Proposal," lists.w3.org/Archives/Public/wwwtalk/msg01499.html, Aug. 11, 1995, VC.0000002-9, 8 pages.
"Open Systems: The latest from X," EXE: The Software Developers' Magazine, vol. 9, issue 1, pp. 70-75, Jun. 1994, VC.0020442-445, 4 pages.
Simson Garfinkel and Gene Spafford, "Practical UNIX Security," (O'Reilly & Associates, Inc. First Printing Jun. 1991), VC.2806664-66, 3 pages.
Ullman, Principles of Database and Knowledge-base Systems, vol. 1 (Computer Science Press 1988), 649 pages. (in 3 parts); Part 1 of 3.
Ullman, Principles of Database and Knowledge-base Systems, vol. 1 (Computer Science Press 1988), 649 pages. (in 3 parts); Part 2 of 3.
Ullman, Principles of Database and Knowledge-base Systems, vol. 1 (Computer Science Press 1988), 649 pages. (in 3 parts); Part 3 of 3.
David M. Kristol and Lou Montulli, "Proposed HTTP State Management Mechanism," HTTP Working Group, Internet Draft, Feb. 16, 1996, NETSCAPE00110381-88, 8 pages.
David M. Kristol, "Proposed HTTP State-Info Mechanism," HTTP Working Group, Internet Draft, Sep. 22, 1995, Jun. 19, 2009, 5 pages.
Sun Microsystems, Inc., RFC 1094: NFS: Network File System Protocol Specification, Network Working Group, Mar. 1989, pp. 1-28, VC.0020312-39, 28 pages.
Farhad Anklesaria, et al., "RFC 1436: The Internet Gopher Protocol (a distributed document search and retrieval protocol)," Network Working Group, Mar. 1993, pp. 1-16, VC.2805478-493, 16 pages.
D. Kristol and L. Montulli, "RFC 2109: HTTP State Management Mechanism," Network Working Group, Feb. 1997, 22 pages.
Abhay Bhushan, RFC 354: The File Transfer Protocol, Network Working Group, Jul. 8, 1972, pp. 1-25, VC.0031355-80, 26 pages.
J. Postel, "RFC 768: User Datagram Protocol," IETF, Aug. 28, 1980, pp. 1-3, VC.0031480-82, 3 pages.
Information Sciences Institute, University of Southern California, "RFC 791: Internet Protocol: DARPA Internet Program Protocol Specification," Sep. 1981, pp. 1-49, VC.2805494-5542, 49 pages.

J. Postel and J. Reynolds, "RFC 959: File Transfer Protocol (FTP)," Network Working Group, Oct. 1985, pp. 1-69, JCK.0000105-173, 69 pages.
Kevin Reichard and Eric F. Johnson, "Securing your X environment. (security in the X Window System) (Cross Thoughts) (Tutorial)(Column)," UNIX Review 13.n2, Feb. 1995, 73(4), VC.0000030-34, 5 pages.
Brian Behlendorf, Session Tracking-org.w3.www-talk- MarkMail, Apr. 17, 1995, VC.0000001, 1 page.
Lou Montulli, Session Tracking-org.w3.www-talk- MarkMail, Apr. 18, 1995, 10:19 p.m., VC.0031588, 1 page.
Lou Montulli, Session Tracking-org.w3.www-talk- MarkMail, Apr. 18, 1995, 11:06 p.m., VC.0001592-93, 2 pages.
Lou Montulli, Session Tracking-org.w3.www-talk- MarkMail, Apr. 19, 1995, 11:04 p.m., VC.0031589, 1 page.
Lou Montulli, Session Tracking-org.w3.www-talk- MarkMail, Apr. 21, 1995, 1:21 p.m., VC.0031591, 1 page.
Joshua Quittner and Michelle Slatella ,Speeding the Net: the Inside Story of Netscape and How it Challenged Microsoft (Atlantic Monthly Press 1998), Aug. 13, 2009, 98 pages.
Paul Burchard, WWW-Talk Apr.-Jun. 1994: Re: Statelessness, available at http://1997.webhistory.org/www.lists/www-talk.1994q2/0570.html, May 16, 1994, p. 1, VC.0020436, 1 page.
J.P. Knight, WWW-Talk Apr.-Jun. 1994: Re: Statelessness, available at http://1997.webhistory.org/www.lists/www-talk.1994q2/0571.html, May 17, 1994, p. 1, VC.0020437, 1 page.
Simon E. Spero, WWW-Talk Apr.-Jun. 1994: Re: Statelessness, available at http://1997.webhistory.org/www.lists/www-talk.1994q2/0690.html, May 29, 1994, p. 1, VC.0020441, 1 page.
Jeffrey C. Mogul, "The Case for Persistent-Connection HTTP," SIGCOMM '95, Aug. 28-Sep. 1, 1995, pp. 299-313, VC.0001566-80, 15 pages.
"The Magic Cookie," Business Computer Systems, Oct. 1984, pp. 134-36, VC.0020446-49, 4 pages.
Jamie Zawinski, "The Netscape Dorm," Dec. 20, 2006, pp. 1-8, VC.0001726- 33, 8 pages.
"The Once and Future Kings," RedHerring.com—The Business of Technology, Nov. 1, 1995, pp. 1-4, VC.0020303-06, 4 pages.
World Wide Web Consortium (W3C) http://www.w3.org/Consortium/facts#history, copyright 2009, retrieved online Jun. 11, 2010, 3 pages.
"WWW-Talk Apr.-Jun. by author 1994," available at : http://1997.webhistory.org/www.lists/www-talk.1994q2/author.html, pp. 1-34, VC.0020493-526, 34 pages.
David M. Kristol, "Proposed HTTP State-Info Mechanism," HTTP Working Group, Internet Draft, <drft-kristol-http-state-info-00.txt>, Aug. 25, 1995, VC.0000010-18, 9 pages.
Jose Kahan, "A Distributed Authorization Model for WWW," (http://www.isoc.org/inet95/proceedings/PAPER/107/html/paper.html), May 5, 1995, VC.0018973-88, 16 pages.
Kahan, Jose; "A New Authorization Model for Distributed Multimedia Information Consultation Systems" (English translation, pp. 1-20) Dec. 15, 1994.
Lou Montulli, "Re: a question . . . ," WWW-talk Jan.-Mar. 1993, Feb. 24, 1993, VC.0018991-92, 2 pages.
Marc Andreessen, "a question . . . ," WWW-talk Jan.-Mar. 1993, Feb. 23, 1993, VC.0018989-90, 2 pages.
Andrew Tappenden and James Miller, "A Three-Tiered Testing Strategy for Cookies", Apr. 9-11, 2008; 2008 International Conference on Software Testing, Verification, and Validation, IEEE, pp. 131-140, 2008, VC.0001702-11, 10 pages.
"About S-HTTP," Commercenet, www.commerce.net/legacy/shttp.html, retrieved online Jul. 13, 2009, VC.2805733, 1 page.
Rick Troth "Re: access and session control," Electronic Mail to multiple recipients of the www-talk list, Sep. 15, 1994, VC.0006564-67, 4 pages.
Motoji Ohmori and Makoto Tatebayashi, "An On-line Shopping System Protecting User's Privacy," Oct. 1994, Information Communication Laboratory of Matsushita Electric Industrial Co., Ltd., Pages of Translation Attached, VC.0008441-60, 20 pages.
William Tao-Yang Wong, "Announce: Secure HTTP Draft Specification," available at http://1997.webhistory.org/www.lists/www-talk.1994q2/0945.html, Jun. 11, 1994, VC.2805739, 1 page.
Archive of WWWorder mailing list, Jun. 1, 1994-Jun. 13, 1994, 27 pages.
Tim Berners-Lee Bio, VC.2807508-12, 5 pages.
Lou Montulli, "Bio of a strumpet," www.mcom.com/people/montulli, Jun. 10, 2009, VC.0020249-50, 2 pages.
Ed Foster, "Can mixing 'cookies' with online marketing be a recipe for heartburn?," InfoWorld Electric, vol. 18, Issue 30, Jul. 22, 1996, NETSCAPE00035462-63, 2 pages.
Takahiro Kiuchi and Shigekoto Kaihara, "C-HTTP—The Development of a Secure, Closed HTTP-based Network on the Internet," Feb. 22-23, 1996, Proceedings of SNDSS, pp. 64-75, 1996, VC.0013452-63, 12 pages.
"Comparison of web server software," Wikipedia, Jun. 10, 2009, VC.0019023-31, 9 pages.
"Conversations with Entrepreneurs—Lee Stein," Cornell University School of Hotel Administration, Dec. 20, 2006, VC.0001700-01, 2 pages.
David M. Kristol, "Cookie I-D Drafts," http://portal.research.bell-labs.com/~dmk/cookie-ver.html, Apr. 9, 1998, NETSCAPE 00035470-72, 3 pages.
Brian Behlendorf, "Cookies," HTTP-wg.Archive: Cookies, Jul. 5, 1995, VC.0019032-33, 2 pages.
Trip, et al., "'Cookies' (client-side persistent information) and their use," Netscape Technical Note 20019, Netscape Communications Corp., Oct. 1995, VC.0007457-58, 2 pages.
David Sheff, "Crank it Up: Marc Andreessen and his dream team at Loudcloud are building the Web's next powerplay: custom-designed, infinitely scalable sites that blast off a virtual assembly line.," Wired 8.08, retrieved online Jun. 10, 2009, VC.0019034-47, 14 pages.
"Crossroads (R)—New Morning Daybook—Sep. 12, 2005," New Morning Daybook, Sep. 12, 2005, VC.0001366-69, 4 pages.
"D.T.'s History Chronology Sep. 1994!," History Chronology Sep. 1994, VC.0001370-73, 4 pages.
Jay P. Kesan and Rajiv C. Shah, "Deconstructing Code," Yale Journal of Law & Technology, 2003-2004, pp. 279-389, VC.0030509-621, Part 1 of 2, pp. 277-332.
Jay P. Kesan and Rajiv C. Shah, "Deconstructing Code," Yale Journal of Law & Technology, 2003-2004, pp. 279-389, VC.0030509-621, Part 2 of 2, pp. 333-389.
"Display Advertising Agreement for Publishers," ValueClick Media, 2008; retrieved online Jun. 8, 2009 from url: https://admin.valueclickmedia.com/publishers/agreement_terms.html?lang=e; VC.2805224-37, 14 pages.
Vincent F. Russo, et al., "Distributed Object Interoperability via a Network Type System," IEEE, pp. 319-27, Sep. 1992, VC.0001686-94, 9 pages.
Charlie Lai, et al., "Endorsements, Licensing, and Insurance for Distributed System Services," Proceedings of the Second ACM Conference on Computer and Communications Security, Nov. 1994, VC.0007597-602, 6 pages.
Federal Trade Commission Transcript of Public Workshop on Consumer Privacy on the Global Information Infrastructure, Jun. 4, 1996, VC.0019488-19763, Part 1 of 2, pp. 1-135.
Federal Trade Commission Transcript of Public Workshop on Consumer Privacy on the Global Information Infrastructure, Jun. 4, 1996, VC.0019488-19763, Part 2 of 2, pp. 136-273.
Federal Trade Commission Transcript of Public Workshop on Consumer Privacy on the Global Information Infrastructure, Jun. 5, 1996, VC.0019764-934, 171 pages.
Federal Trade Commission Transcript Session Two of Public Workshop on Consumer Information Privacy, Jun. 11, 1997, VC.0019134-487, Part 1 of 2, pp. 1-177.
Federal Trade Commission Transcript Session Two of Public Workshop on Consumer Information Privacy, Jun. 11, 1997, VC.0019134-487, Part 2 of 2, pp. 178-324.
File History for USPN 5,774,670, Oct. 6, 1995-Jun. 30, 1998, VC.0001734-846, 113 pages.
"Re: Firefox Lite, Mozilla Lite, Thunderbird Lite—where to find them?:msg#00006," Osdir.com, Osdir/mail archive, Nov. 21, 1994, VC.0019130-33, 4 pages.
John Schwartz, "Giving the Web a Memory Cost Its Users Privacy," The New York Times, nytimes.com, Sep. 4, 2001, VC.0020360-70, 11 pages.

"HTTP Cookie—Wikipedia, the free encyclopedia," Oct. 16, 2006, VC.0001716-25, 10 pages.
David M. Kristol, "HTTP Cookies: Standards, Privacy, and Politics," ACM Transactions on Internet Technology, vol. 1, No. 2, pp. 151-98, Nov. 2001, VC.0001485-1532, 48 pages.
Tim Berners-Lee and Daniel Connolly, "Hypertext Markup Language (HTML): A Representation of Textual Information and MetaInformation for Retrieval and Interchange," Internet Draft, IIIR Working Group, Jun. 1993, VC.0019943-76, 34 pages.
Venkata N. Padmanabhan and Jeffrey C. Mogul, "Improving HTTP latency," Aug. 28, 1995-Sep. 1, 1995, Computer Networks and ISDN Systems 28, pp. 25-35, 1995, VC.0001668-79, 12 pages.
Index of http://panda.bg.univ.gda.pl/pub/win/16bit/net/netscape, Jun. 23, 2010, 1 page.
Tim Berners-Lee and Daniel Connolly, "Hypertext Markup Language (HTML)," Internet Draft, IIIR Working Group, Jun. 1993, VC.2805438-77, 40 pages.
"Linux Journal 2009 Archive cdrom is now available," date unknown, Linux Journal, VC.0020189-90, 2 pages.
Tim Berners-Lee, "Logging user access. Was: a question . . . ," www-talk Jan.-Mar. 1993, Feb. 24, 1993, VC.0020191-92, 2 pages.
Jill Mohler, "Lotus LMS and Lotus Virtual Classroom evolve—Jan. 1, 1994," Dandelife.com, Oct. 24, 2008, VC.0001581-83, 3 pages.
M. Hedlund, "Re: making progress on State-Info," HTTP-wg Archive, 1st entry in email chain, Dec. 8, 1995, VC.0020195, 1 page.
M. Hedlund, "Re: making progress on State-Info," HTTP-wg Archive, 2nd entry in email chain, Dec. 8, 1995, VC.0020193-94, 2 pages.
Martin Heller, "Programming Windows: Memory Management Past, Present, and Future," Windows Magazine, pp. 159-61, Feb. 1992, VC.0020198-200, 3 pages.
"Method for Managing Client/Server Relationships in the AIX Operating System," date unknown, VC.2806515-17, 3 pages.
R. Scott Raynovich, "Microsoft readies browser update," LAN Times, v.13 No. 17, p. 7(1), Aug. 5, 1996, VC.0001685, 1 page.
"Mozilla—Wikipedia, the free encyclopedia," Dec. 20, 2006, VC.0001594-97, 4 pages.
Andrew Stuart, "Mysteries of the Internet: Where cookie comes from," Domino Power Magazine, Feb. 2002, VC.0019048-49, 2 pages.
NCSA HTTPd release notes "Upgrading NCSA HTTPd", retrieved online at http://hoohoo.ncsa.uius.edu/docs/Upgrade.html, Aug. 1, 1995, 11 pages.
Gennady Medvinsky and B. Clifford Neuman, "NetCash: A design for practical electronic currency on the Internet," ACM 1st Conf. Computer & Comm. Security, Nov. 1993, VC.0008423-27, 5 pages.
"Netscape Analysis Report: Accounting 2 Honors," Fortunecity.com, Oct. 25, 2008, VC.0001598-1601, 4 pages.
Netscape Communications News Release, "Netscape Communications Offers New Network Navigator Free on the Internet: Netscape Communications Now, Builds on Tradition of Freeware for the Net," Oct. 13, 1994, VC.0001602-03, 2 pages.
Netscape Merchant System Data Sheet, NETSCAPE00111245-51, 1997, 7 pages.
Michael D., "Netscape No More," John Cole's Balloon Juice, Blog Archive, Dec. 8, 2008, VC.0001542-65, 24 pages.
ODBC and Mosaic—comp.databases, Google groups email chain, available at http://groups.google.com/group/comp.databases/browse_threadfthread..., Sep. 26, 1994-Oct. 5, 1994, retrieved online Jun. 10, 2009, VC.0020259-62, 4 pages.
Online Newspaper to Develop Internet Products with Mosaic Communications Software News Release, San Jose Mercury News Aug. 22, 1994, NETSCAPE00015246-47, 2 pages.
Peter H. Lewis, "Pacific Bell, MCI to Expand Internet Service," The New York Times, nytimes.com, Mar. 28, 1995, VC.0020263-64, 2 pages.
"Persistent Client State HTTP Cookies Netscape: Preliminary Specification—Use with caution," Client Side State—HTTP Cookies, Netscape Support Documentation, http://home.netscape.com./newsref/std/cookie_spec.htm, retrieved Nov. 19, 1997, VC.0001604-07, 4 pages.
Christopher Allen, "FWD: Press Release: RSA and EIT Joint Venture," available at http://1997.webhistory.org/www.lists/www-talk.1994q2/0980.html, Jun. 14, 1994, VC.2805734-38, 5 pages.
Amitabh Dave, et al., "Proxies, Application Interfaces, and Distributed Systems," IEEE Second Int'l Workshop on Object Orientation in Operating Systems, Sep. 24, 1992-Sep. 25, 1992, pp. 212-220, 1992, VC.0001374-82, 9 pages.
Mark L. Van Name and Bill Catchings, "Putting the lid on Pandora's cookie jar," PC Week, vol. 13, No. 33, p. N8, Aug. 19, 1996, NETSCAPE00035465-66, 2 pages.
Rajiv C. Shah and Jay P. Kesan, "Recipes for Cookies: How Institutions Shape Communication Technologies," Recipes for Cookies, Oct. 20, 2007, VC.0020267-302, 36 pages.
RFC 1310, "The Internet Standards Process," IETF, Mar. 1992, 21 pages.
F. Anklesaria, et al., RFC 1436: The Internet Gopher Protocol (a distributed document search and retrieval protocol), Network Working Group, Mar. 1993, VC.2805478-2805493, 16 pages.
Kohl, et al.; RFC 1510, "The Kerberos Network Authentication Service (V5)," IETF, Sep. 1993, 112 pages.
Borenstein, et al.; RFC 1521, "MIME (Multipurpose Internet Mail Extensions Part One: Mechanisms for Specifying and Describing the Format of Internet Message Bodies," IETF, Sep. 1993, 75 pages.
Internet Architecture Board and Internet Engineering Steering Group, "RFC 1602: The Internet Standards Process—Revision 2," Network Working Group, Mar. 1994, VC.0030998-1035, 38 pages.
K. Moore and N. Freed, "RFC 2964: Use of HTTP State Management," Network Working Group, Oct. 2000, VC.0031319-327, 9 pages.
S. Bradner, "RFC 3668: Intellectual Property Rights in IETF Technology," Network Working Group, Feb. 2004, VC.2805555-71, 17 pages.
S. Bradner, "RFC 3979: Intellectual Property Rights in IETF Technology," Network Working Group, Mar. 2005, VC.0031381-98, 18 pages.
T. Narten, "RFC 4879: Clarification of the Third Party Disclosure Procedure in RFC 3979," Network Working Group, Apr. 2007, VC.0031399-403, 5 pages.
RFC Editor, "RFC 5000: Internet Official Protocol Standards," Network Working Group, May 2008, VC.0031404-79, 76 pages.
Jonathan B. Postel, "RFC 821: Simple Mail Transfer Protocol," IETF, Aug. 1982, VC.0031483-587, 105 pages.
RFC Index, IETF, http://www.ietf.org/iesg/1rfc_index.txt, VC.0030652-975, May 27, 2009, Part 1 of 3, pp. 1-108.
RFC Index, IETF, http://www.ietf.org/iesg/1rfc_index.txt, VC.0030652-975, May 27, 2009, Part 2 of 3, pp. 109-217.
RFC Index, IETF, http://www.ietf.org/iesg/1rfc_index.txt, VC.0030652-975, May 27, 2009, Part 3 of 3, pp. 218-324.
Eric Bina et al., "Secure Access to Data Over the Internet," Natl. Center for Supercomputing Appls., Unv. Of Illinois, Champaign, Illinois, pp. 99-102, Feb. 1994, VC.0008399-8402, 4 pages.
Jeffrey I. Schiller, "Secure Distributed Computing," Scientific American, vol. 271, No. 5, pp. 72-76, Nov. 1994, VC.2806632-38, 7 pages.
SGI IRIX 5.3 Product Release Notes/Information, SGI TPL View (ns_enterprise), retrieved Jun. 9, 2009, VC.0020376-391, 16 pages.
Alex Lash, "SGI, Netscape to build servers," CNET News, Sep. 2, 1997, VC.0020392-94, 3 pages.
SGIstuff: Software: IRIX Versions (http://sgistuff.g-lenerz.de/software/irixversions.php), modified Apr. 10, 2009, retrieved Jun. 9, 2009, VC.0020397-432, 36 pages.
Jay P. Kesan and Rajiv C. Sheh, Shaping Code, pp. 1-186, dated Aug. 2002, VC.0001389-1481, 93 pages.
"Silicon Graphics Standardizes on Netscape Software for Corporate Internet and Intranet Use," Netscape Communications Corp., prnewswire.ca, dated Jan. 30, VC.0020395-96, 2 pages.
Roy Fielding, "wwwstat: httpd logfile analysis package," (published at http://www.ics.uci.edu/WebSoft/wwwstat/), Apr. 24, 1994, VC.0007049-58, 10 pages.
Soverain's Disclosure of Asserted Claims and Preliminary Infringement Contentions, dated Jun. 3, 2004, VC.0008633-8727, 95 pages.

Soverain's Fourth Supplemental Responses to Amazon.com's First Set of Interrogatories (Nos. 1-14), dated Mar. 21, 2005, VC.0008622-32, 11 pages.
Soverain's Responses to Amazon.com's First Set of Requests for Admission to Plaintiff Soverain Software (Nos. 1-100), dated Mar. 21, 2005, VC.0008574-621, 48 pages.
Soverain's Responses to Interrogatory Nos. 22, 23, 26 and 36 of Amazon.com's Third Set of Interrogatories (Nos. 17-38), dated Mar. 21, 2005, VC.0008548-56, 9 pages.
Soverain's Second Supplemental Responses to Amazon.com's First Set of Interrogatories (Nos. 1-14), dated Sep. 21, 2004, VC.0014476-89, 14 pages.
Suddenly, Videotex is Finding an Audience Business Week, pp. 92-94 Oct. 19, 1987.
Supplemental Disclosure of Preliminary Invalidity Contentions by Defendants Amazon.com, Inc. and the Gap, Inc., dated Jul. 26, 2004, VC.0008508-47, 40 pages.
Shawn P. McCarthy, "The Netscape Biscuit Company serves up a snack that knows you," Government Computer News, v.15 No. 24, pp. 55(2), Sep. 23, 1996, VC.0001539-41, 3 pages.
"The Platform for Privacy Preferences 1.0 (P3P1.0) Specification," W3C Recommendation, Apr. 16, 2002, VC.2806930-991, 62 pages.
Xie Chunvan Sherman, "The Story of Cookie," Infocomm Security/QA, National University of Singapore, Jun. 18, 2003, VC.0001695-99, 5 pages.
Douglas Comer and Thomas P. Muriagh, "The Tilde File Naming Scheme," (6th International Conference on Distributed Computing Systems, IEEE Computer Society, Cambridge, Massachusetts, May 19-23, 1986, pp. 509-514), VC.0009768-75, 8 pages.
"The Trouble With Cookies," CMP Net Guide, Issue 305, dated May 1, 1996, VC.0001364-65, 2 pages.
The Unix-Haters Handbook (Simson Garfinkel, et al. eds., IDG Books Worldwide, Inc. 1994), First Printing May 1994, VC.0000035-393, Part 1 of 2, pp. iv-143.
The Unix-Haters Handbook (Simson Garfinkel, et al. eds., IDG Books Worldwide, Inc. 1994), First Printing May 1994, VC.0000035-393, Part 2 of 2, pp. 144-330.
Mark Handley and Jon Crowcroft, The World Wide Web: Beneath the surf (UCL Press 1995), VC.2805428-37, 10 pages.
Christian Derler, "The World-Wide Web Gateway to Hyper-G: Using a Connectionless Protocol to Access Session- Oriented Services," Institut fur Informationsverarbeitung and Computergestutzte neue Medien, Graz, Austria, Mar. 1995, VC.0006568-6672, 105 pages.
Third Supplement to Defendant Amazon.com's Initial Disclosures, dated Mar. 4, 2005, VC.0008500-07, 8 pages.
"Torpid News Under Netscape," Google groups, comp.infosystems.www.misc, dated Oct. 25, 1994, VC.0020457-59, 3 pages.
Videotaped Deposition of Andrew C. Payne (Mar. 11, 2005), VC.0012815-13116, Part 1 of 2, pp. 1-151.
Videotaped Deposition of Andrew C. Payne (Mar. 11, 2005), VC.0012815-13116, Part 2 of 2, pp. 152-302.
Videotaped Deposition of Glenn Crocker with Exhibits (Mar. 10, 2005), VC.0013353-428, 76 pages.
Deposition of Glenn M. Trewitt (Jan. 25, 2005), VC.0011325-578, 254 pages.
Deposition of Glenn M. Trewitt Exhibits 1-30 (Jan. 25, 2005), VC.0011652-12153, Part 1 of 3, pp. 1-167.
Deposition of Glenn M. Trewitt Exhibits 1-30 (Jan. 25, 2005), VC.0011652-12153, Part 2 of 3, pp. 168-333.
Deposition of Glenn M. Trewitt Exhibits 1-30 (Jan. 25, 2005), VC.0011652-12153, Part 3 of 3, pp. 334-502.
Videotaped Deposition of Kevin Ming-Wei Kadaja Hughes with Exhibits (Mar. 21, 2005), VC.0013117-243, 127 pages.
Videotaped Deposition of Thomas Mark Levergood (Mar. 8, 2005), VC.0012607-814, Part 1 of 2, pp. 1-104.
Videotaped Deposition of Thomas Mark Levergood (Mar. 8, 2005), VC.0012607-814, Part 2 of 2, pp. 105-208.
Videotaped Deposition of Phillip Hallam-Baker with Exhibits (Mar. 11, 2005), VC.0010365-417, 53 pages.
Videotaped Deposition of Robert Allen Olson with Exhibits (Mar. 3, 2005), VC.0010582-620, 39 pages.
Videotaped Deposition of Stephen Jeffrey Morris (Mar. 9, 2005), VC.0012154-211, 58 pages.
Videotaped Deposition of Guy Henry Haskin with Exhibits (Mar. 18, 2005), VC.0010274-364, 91 pages.
Videotaped Deposition of Michael Kuniaysky (Feb. 22, 2005), VC.0010829-11324, Part 1 of 3, pp. 1-166.
Videotaped Deposition of Michael Kuniaysky (Feb. 22, 2005), VC.0010829-11324, Part 2 of 3, pp. 167-333.
Videotaped Deposition of Michael Kuniaysky (Feb. 22, 2005), VC.0010829-11324, Part 3 of 3, pp. 334-496.
Videotaped Deposition of Michael Kuniaysky Exhibits 1-24 (Feb. 22, 2005), VC.0011579-651, 73 pages.
Alexander Pershteyn and Omar Odeh, "Web Browsers," Expert Paper, Oct. 25, 2008, NETSCAPE00134149-53, 5 pages.
"What's New, Feb. 1994," (http://archive.ncsa.uiuc.edu/SDG/Software/Mosaic/Docs/old-whats-new/whats-new-0294...html), Feb. 1994, VC.0009794-9810, 17 pages.
Paul Wallich, "Wire Pirates," Scientific American, pp. 90-101, Mar. 1994, VC.2805543-51, 9 pages.
P. Remery, et al., "Le paiement electronique," L'Echo des Recherches, No. 134, 4th Quarter 1988, w/English translation, 39 pages.
Berners-Lee, Tim, "A Summary of the WorldWideWeb System," ConneXions, The Interoperability Report, Jul. 1992, vol. 6, No. 7, Part 1 of 2, pp. 1-16.
Berners-Lee, Tim, "A Summary of the WorldWideWeb System," ConneXions, The Interoperability Report, Jul. 1992, vol. 6, No. 7, Part 2 of 2, pp. 17-32.
"VeriSign, Inc. to Provide Digital IDs for Open Market's Secure WebServer; Key technology for verifying the identities of parties in electronic commerce," Business Wire, Aug. 14, 1995, 2 pages.
"VeriSign, Inc. Adds the Missing Component to Online Security Solutions Online Security Solutions; VeriSign offers a service essential to trusted and secure electronic commerce and communications," Business Wire, Jun. 22, 1995, 2 pages.
CCITT, Recommendation X.509: The Directory Authentication Framework CCITT, Nov. 1988, 34 pages.
Kleiman, S.R., "Vnodes: An Architecture for Multiple File System Types in Sun UNIX," (SunMicrosystems sun/srk), Jun. 1986 USENIX Conference, 10 pages.
Pettersen, Y., "Identifying origin server of HTTP Cookies draft-pettersen-cookieorigin- 01," Network Working Group, Internet-Draft, Mar. 7, 2010, 8 pages.
"HTTP Cookies," TMDHosting blog.com, Mar. 18, 2009, 6 pages.
Sandberg, R., et al., "Design and Implementation of the Sun Network Filesystem," (Sun Microsystems, Inc.), Jun. 1985 USENIX Conference, 12 pages.
Olander, D., et al., "A Framework for Networking in System V," (AT&T), Jun. 1986 USENIX Conference, 8 pages.
Hamilton, R., et al., "An Administrator's View of Remote File Sharing," (AT&T Information Systems), date unknown, 9 pages.
Heynmoller, U., "Aufbau and Funktionsweise des Unix-Betriebssystems," (Elektronik 16/8.8, pp. 67-70) 1986, 10 pages with English Translation.
CCITT Blue Book, vol. VIII; Nov. 1988, pp. 48-81, 36 pages.
Data & Computer Communications Stallings, MacMillan Publishing, date unknown, pp. 245-252, 8 pages.
Bender, M, "EFTS: Electronic Funds Transfer Systems," (Kennikat Press: Port Washington, New York; pp. 43-46), date unknown, 4 pages.
European Search Report dated Jun. 19, 2006 for European patent application 01110827.1-2221, 4 pages.
Houghton, T., "File System Switch," (AT&T Information Systems), date unknown, 2 pages.
Walsh, D., et al., "Overview of the Sun Network File System," (Sun Microsystems, pp. 117-124), Jan. 1985 USENIX Conference, 8 pages.
Chang, J., "Status Monitor Provides Network Locking Service for NFS," date unknown, Abstract, 3 pages.
Chang, J., "SunNet," Abstract, (Sun Microsystems, Inc., pp. 71-75), Jun. 1985 USENIX Conference, 5 pp.
Van Name, M.L.; "Putting the lid on Pandora's cookie jar"; PC WEEK magazine v13 n33 p. 8; Ziff-Davis Publishing Co., Aug. 19, 1996.

Foster, E.; "Can mixing 'cookies' with online marketing be a recipe for heartburn?"; InfoWorld magazine v18 n30 p. 54; InfoWorld Publishing Company, Jul. 22, 1996.
Raynovich, R.S.; "Microsoft readies browser update"; LAN Times v13 n17 p. 7; The McGraw-Hill Companies, Inc., Aug. 5, 1996.
Netscape: "Persistent Client State HTTP Cookies"; retrieved from the Internet on Nov. 19, 1997 <URL=http://home.netscape.com/newsref/std/cookie_spec.htm.
Montulli, L. et al.; "Proposed HTTP State Management Mechanism", HTTP Working Group, Feb. 16, 1996.
CMP Netguide magazine; "The Trouble With Cookies"; Issue 305; CMP Media, May 1, 1996.
Kristol, D.M.; "Proposed HTTP Sate-Info Mechanism"; HTTP Working Group, Sep. 22, 1995.

* cited by examiner

```
<Title>Distributed Image Loading Example</Title>
<h1>Distributed Image Loading Example</h1>

One of the major features of the world-wide-web is the ability to retieve images
from sites distributed around the world. These images can then be combined
with a text document retrieved separatly and presented as a single "virtual"
document to an end-user. This HTML document demonstrates this capability.<p>

This document was fetched from a server in northern California. However,
this image:
<IMG align=middle src="http://www.nesa.uiue.edu/demoweb/al-small.gif">
was obtained from Illinois. <P>

And this one: <IMG align=middle src="http://www.su.se/SUlogo.gif"> came
from the <A href="http://www.su.se/index.html"> University of
Stockholm</A>.
```

*FIG. 3A*

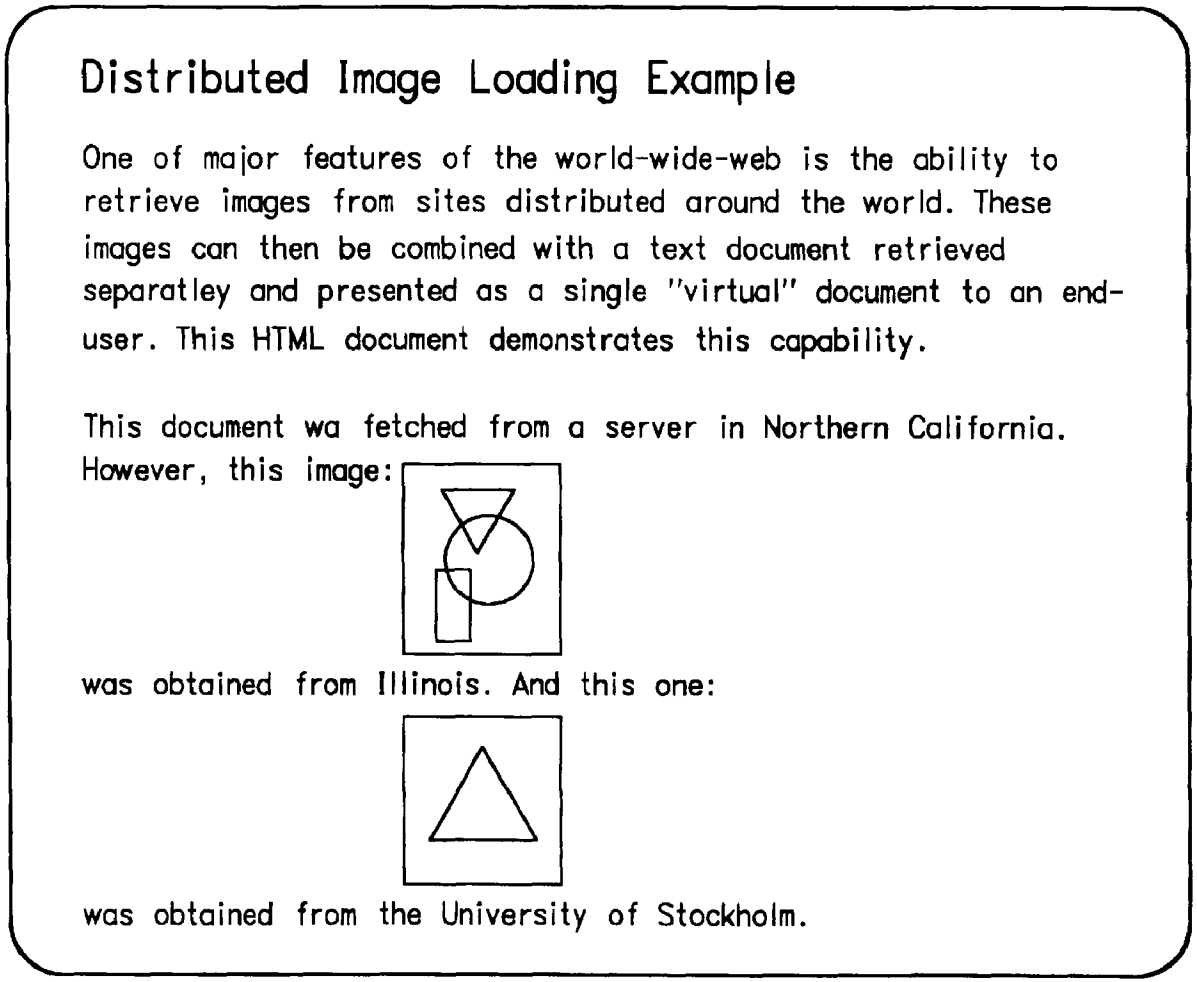

Distributed Image Loading Example

One of major features of the world-wide-web is the ability to retrieve images from sites distributed around the world. These images can then be combined with a text document retrieved separatley and presented as a single "virtual" document to an end-user. This HTML document demonstrates this capability.

This document wa fetched from a server in Northern California. However, this image:

was obtained from Illinois. And this one:

was obtained from the University of Stockholm.

*FIG. 3B*

METHOD AND APPARATUS FOR MAINTAINING STATE INFORMATION ON AN HTTP CLIENT SYSTEM IN RELATION TO SERVER DOMAIN AND PATH ATTRIBUTES

Matter enclosed in heavy brackets [ ] appears in the original patent but forms no part of this reissue specification; matter printed in italics indicates the additions made by reissue.

[This application is a divisional of U.S. patent application Ser. No. 08/540,342, filed Oct. 6, 1995, which is now U.S. Pat. No. 5,774,670, which issued on Jun. 30,1998.]

*CROSS REFERENCE TO RELATED APPLICATIONS*

*This application is a reissue application of U.S. Pat. No. 6,134,592 granted Oct. 17, 2000 (application Ser. No. 08/918,977 filed Aug. 27, 1997), which is a divisional of U.S. Pat. No. 5,774,670 granted Jun. 30, 1998 (application Ser. No. 08/540,342, filed Oct. 6, 1995). Notice: More than one reissue application has been filed for the reissue of U.S. Pat. No. 6,134,592. The reissue applications of U.S. Pat. No. 6,134,592 are U.S. patent application Ser. No. 10/272,896 (the present application), as well as its divisional reissue applications including U.S. patent application Ser. Nos. 11/737,043, 11/737,042 and 11/737,055 all of which were filed on Apr. 18, 2007.*

FIELD OF THE INVENTION

This invention relates to communication in a client-server computer systems. Specifically, the invention relates to client-server computer systems in which a server can send state information to a client and the client stores the state information for later retransmissions back to the server.

BACKGROUND OF THE INVENTION

An important use of computers is the transfer of information over a network. Currently, the largest computer network in existence is the InterNet. The InterNet is a worldwide interconnection of computer networks that communicate using a common protocol. Millions of computers, from low end personal computers to high-end super computers are coupled to the InterNet.

The InterNet grew out of work funded in the 1960s by the U.S. Defense Department's Advanced Research Projects Agency. For a long time, InterNet was used by researchers in universities and national laboratories to share information. As the existence of the InterNet became more widely known, many users outside of the academic/research community (e.g., employees of large corporations) started to use InterNet to carry electronic mail.

In 1989, a new type of information system known as the World-Wide-Web ("the Web") was introduced to the InterNet. Early development of the Web took place at CERN, the European Particle Physics Laboratory. The Web is a wide-area hypermedia information retrieval system aimed to give wide access to a large universe of documents. At that time, the Web was known to and used by the academic/research community only. There was no easily available tool which allows a technically untrained person to access the Web.

In 1993, researchers at the National Center for Supercomputing Applications (NCSA) released a Web browser called "Mosiac" that implemented a graphical user interface (GUI). Mosiac's graphical user interface was simple to learn yet powerful. The Mosiac browser allows a user to retrieve documents from the World-Wide-Web using simple point-and-click commands. Because the user does not have to be technically trained and the browser is pleasant to use, it has the potential of opening up the InterNet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

The communication model under the conventional Web environment provides a very limited level of interaction between clients and servers. In many systems, increasing the level of interaction between components in the systems often makes the systems more robust, but increasing the interaction increases the complexity of the interaction and typically slows the rate of the interaction. Thus, the conventional Web environment provides less complex, faster interactions because of the Web's level of interaction between clients and servers.

In the conventional Web environment, clients do not retain information of a session after the session is closed. In many systems, the ability to retain information after the systems become inactive is crucial to the functioning of the systems. Thus, it is desirable to allow clients to have this ability.

SUMMARY OF THE INVENTION

The present invention involves a client-server system on a network in which a server can send state information to a client and the client stores the state information. The stored state information can later be sent back to the server at appropriate times. In this manner, the state of a client can be maintained in the client-server system where no state inherently exists in such a system.

One embodiment of the present invention is a network system for communicating documents containing information such as text and one or more images. The system comprises a first computer (i.e., a server) capable of sending such documents over a network such as the InterNet. The system also has a second computer (i.e., a client) which can request these documents or files from the server. After the requested documents are received, the client can display the documents. In accordance with the present invention, the server can send state information to the client when a document is sent. The client then stores the state information, which is typically in the form of a state object. In a subsequent request for documents to the server, the client can send the stored state information to the server.

In an embodiment of the invention, the server uses a hypertext transfer protocol ("http") to communicate over the network with clients; such clients also communicate with the server using the hypertext transfer protocol. This server and these clients are referred to as an http server and http clients respectively. The server typically will include a server processor and a memory and a computer readable medium, such as a magnetic ("hard disk") or optical mass storage device, and the computer readable medium of the server contains computer program instructions for transmitting the file from the server system to the client system and for transmitting the state object to the client system. The client typically will include a client processor and a memory and a computer readable medium, such as a magnetic or optical mass storage device, and the computer readable medium of the client contains computer program instructions for receiving the state object, which specifies the state information, from the server and for storing the state object at the client. The state object, in a typical embodiment, will include a name attribute, such as a domain attribute.

One of the applications of the present invention is an on-line shopping system. A customer can browse information delivered by a merchant server using a browser running on a client. The customer can also select products to be placed in a virtual shopping basket. The server then sends state information related to the selected products to the browser on the client for storage. When the customer wants to purchase the products in the virtual shopping basket, the browser sends the corresponding state information to a specified check-out Web page for processing.

Another application of the present invention is an "on-line" information service, such as a newspaper's Web server which includes articles or other information from the newspaper's subscription services. In one example, a newspaper or publishing company may have several different publications, each requiring a separate subscription fee which may differ among the different publications. A user of the information service may browse the different publications by making http requests, from the client's/user's computer system, to the publisher's Web server which responds with the requested publication and state information specifying the user's identification, and other subscription information (e.g., user registration and billing information) which allows the user to view the contents of the publication; this information is typically provided by the user at least once in a conventional log-on process. Thereafter, this information is included in the state information which is exchanged between the client and the server in the process of the invention. Accordingly, when the user, during the browsing process, desires to view another publication (e.g., from the same or different publisher) this state information will be transmitted back to the Web server to provide the necessary subscription information (thereby entitling the user to view the publication) without requiring the user to re-enter the necessary subscription information. In this manner, a user may browse from publication to publication on the Web server or a different Web server in the domain without having to re-enter, when seeking a new publication, the necessary subscription information.

These and other features of the present invention will be disclosed in the following description of the invention together with the accompanying drawings.

BRIEF DESCRIPTION OF THE DRAWINGS

The objects, features, and advantages of the present invention will be apparent from the following detailed description of the preferred embodiment of the invention with references to the following drawings.

FIG. 3A shows an example of an HTML document which can be processed by the browser of the present invention.

FIG. 3B shows the integrated document corresponding to the HTML document of FIG. 3A as it would appear on a display screen of a client computer.

DETAILED DESCRIPTION

Methods and apparatuses for maintaining state information in a client-server based computer network system are disclosed. The following description is presented to enable any person skilled in the art to make and use the invention. For purposes of explanation, specific nomenclature is set forth to provide a thorough understanding of the present invention. However, it will be apparent to one skilled in the art that these specific details are not required to practice the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Prior to describing the present invention, some introductory material is explained, including explanations concerning client-server computing, InterNet addresses, URL's and browsing of the Web.

Client-Server Computing

Figure 1A:
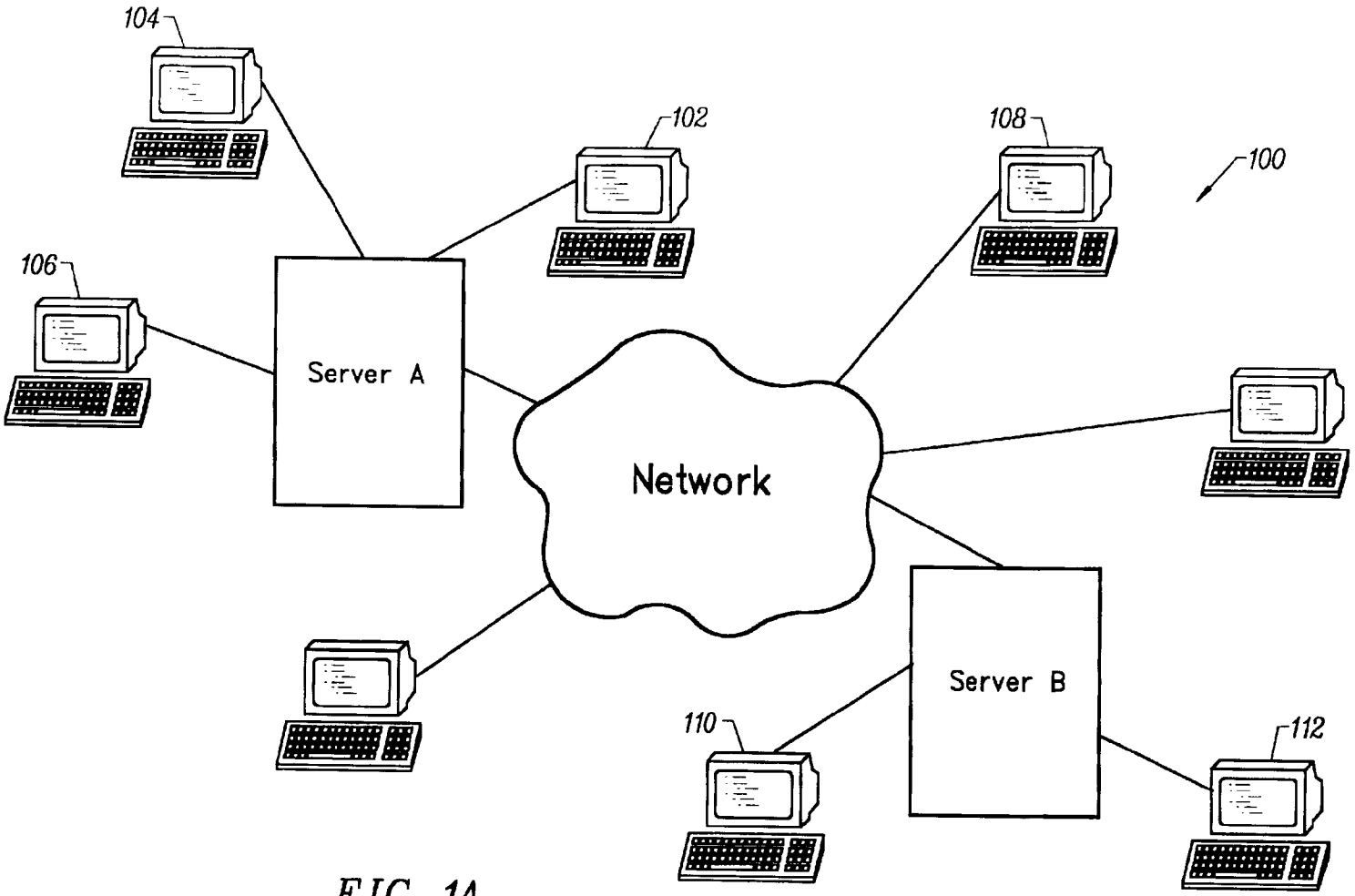
FIG. 1A is a pictorial diagram of a computer network used in the present invention.

FIG. 1A illustrates a conceptual diagram of a computer network 100, such as the InterNet. Computer network 100 comprises small computers (such as computers 102, 104, 106, 108, 110 and 112) and large computers, such as computers A and B, commonly used as servers. In general, small computers are "personal computers" or workstations and are the sites at which a human user operates the computer to make requests for data from other computers or servers on the network. Usually, the requested data resides in large computers. In this scenario, small computers are clients and the large computers are servers. In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 102, may request a file from server A. Since computer 102 is directly connected to server A through a local area network, this request would not normally result in a transfer of data over what is shown as the "network" of FIG. 1. The "network" of FIG. 1 represents the InterNet which is an interconnection of networks. A different request from computer 102 may be for a file that resides in server B. In this case, the data is transferred from server B through the network to server A and, finally, to computer 102. The distance between servers A and B may be very long, e.g. across continents, or very short, e.g., within the same city. Further, in traversing the network the data may be transferred through several intermediate servers and many routing devices, such as bridges and routers.

The World-Wide-Web ("The Web") uses the client-server model to communicate information between clients and servers. Web Servers are coupled to the InterNet and respond to document requests from Web clients. Web clients (also known as Web "browsers") are programs that allow a user to simply access Web documents located on Web Servers.

Figure 1B:
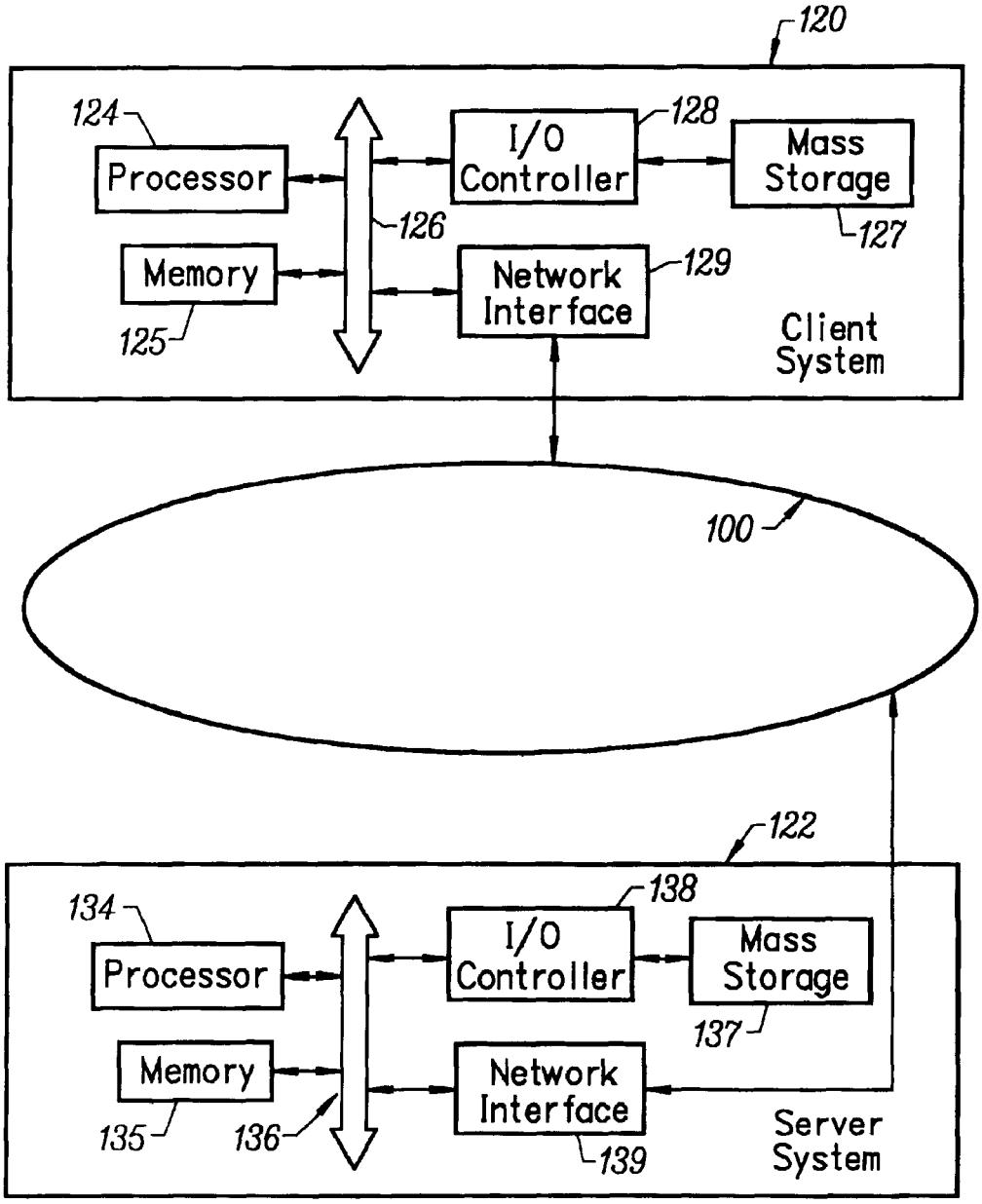
FIG. 1B shows a computer network containing a client system and a server system.

FIG. 1B shows, in more detail, an example of a client-server system interconnected through the InterNet 100. In this example, a remote server system 122 is interconnected through the InterNet to client system 120. The client system 120 includes conventional components such as a processor 124, memory 125 (e.g. RAM), a bus 126 which couples the processor 124 and memory 125, a mass storage device 127 (e.g. a magnetic hard disk or an optical storage disk) coupled to the processor and memory through an I/O controller 128 and a network interface 129, such as a conventional modem. The server system 122 also includes conventional components such as a processor 134, memory 135 (e.g. RAM), a bus 136 which couples the processor 134 and memory 135, a mass storage device 137 (e.g. a magnetic or optical disk) coupled to the processor 134 and memory 135 through an I/O controller 138 and a network interface 139, such as a conventional modem. It will be appreciated from the description below that the present invention may be implemented in software which is stored as executable instructions on a computer readable medium on the client and server systems, such as mass storage devices 127 and 137 respectively, or in memories 125 and 135 respectively.

InterNet Addresses

As discussed in the background, the InterNet consists of a worldwide computer network that communicates using well defined protocol known as the InterNet Protocol (IP). Computer systems that are directly connected to the InterNet each have an unique InterNet address. An InterNet address consists of four numbers where each number is less than 256. The four numbers of an InterNet address are commonly written out separated by periods such as 192.101.0.3

To simplify InterNet addressing, the "Domain Name System" was created. The domain name system allows users to access InterNet resources with a simpler alphanumeric naming system. An InterNet Domain name consists of a series of alphanumeric names separated by periods. For example, the name "drizzle.stanford.edu" is the name for a computer in the physics department at Stanford University. Read from left to right, each name defines a subset of the name immediately to the right. In this example, "drizzle" is the name of a workstation in the "stanford" domain. Furthermore, "stanford" is a subset of the "edu" domain. When a domain name is used, the computer accesses a "Domain Name Server" to obtain the explicit four number InterNet address.

Uniform Resource Locators

To further define the addresses of resources on the InterNet, the Uniform Resource Locator system was created. A Uniform Resource Locator (URL) is a descriptor that specifically defines a type of InterNet resource and its location. URLs have the following format:

resource_type://domain.address/path_name

Where "resource_type" defines the type of internet resource. Web documents are identified by the resource type "http" which indicates that the hypertext transfer protocol should be used to access the document. Other resource types include "ftp" (file transmission protocol) and "telnet". The "domain.address" defines the domain name address of the computer that the /resource is located on. Finally, the "path_name" defines a directory path within the file system of the server that identifies the resource. The right most name on the path name portion is usually the name of an actual file. Web pages are identified by the resource type "http". By convention, most Web pages end with the suffix ".html" that suggests the file is a HyperText Markup Language document.

An example of a URL for a Web document is:

http://info.cern.ch/hypertext/Datasources/WWW/Geographical.html

This URL indicates that by using the HTTP (Web) protocol to reach a server called "info.cern.ch", there is a directory "hypertext/Datasources/WWW" that contains a hypertext document named "Geographical.html." Resources on the Internet are uniquely addressable by their URL.

Browsing the World-Wide-Web

To access an initial Web document, the user enters the URL for a Web document into a Web browser program. The Web browser then sends an http request to the server that has the Web document using the URL. The Web server responds to the http request by sending the requested HTTP object to the client. In most cases, the HTTP object is an plain text (ASCII) document containing text (in ASCII) that is written in HyperText Markup Language (HTML). The HTML document usually contains hyperlinks to other Web documents. The Web browser displays the HTML document on the screen for the user and the hyperlinks to other Web documents are emphasized in some fashion such that the user can selected the hyperlink.

Figure 2:
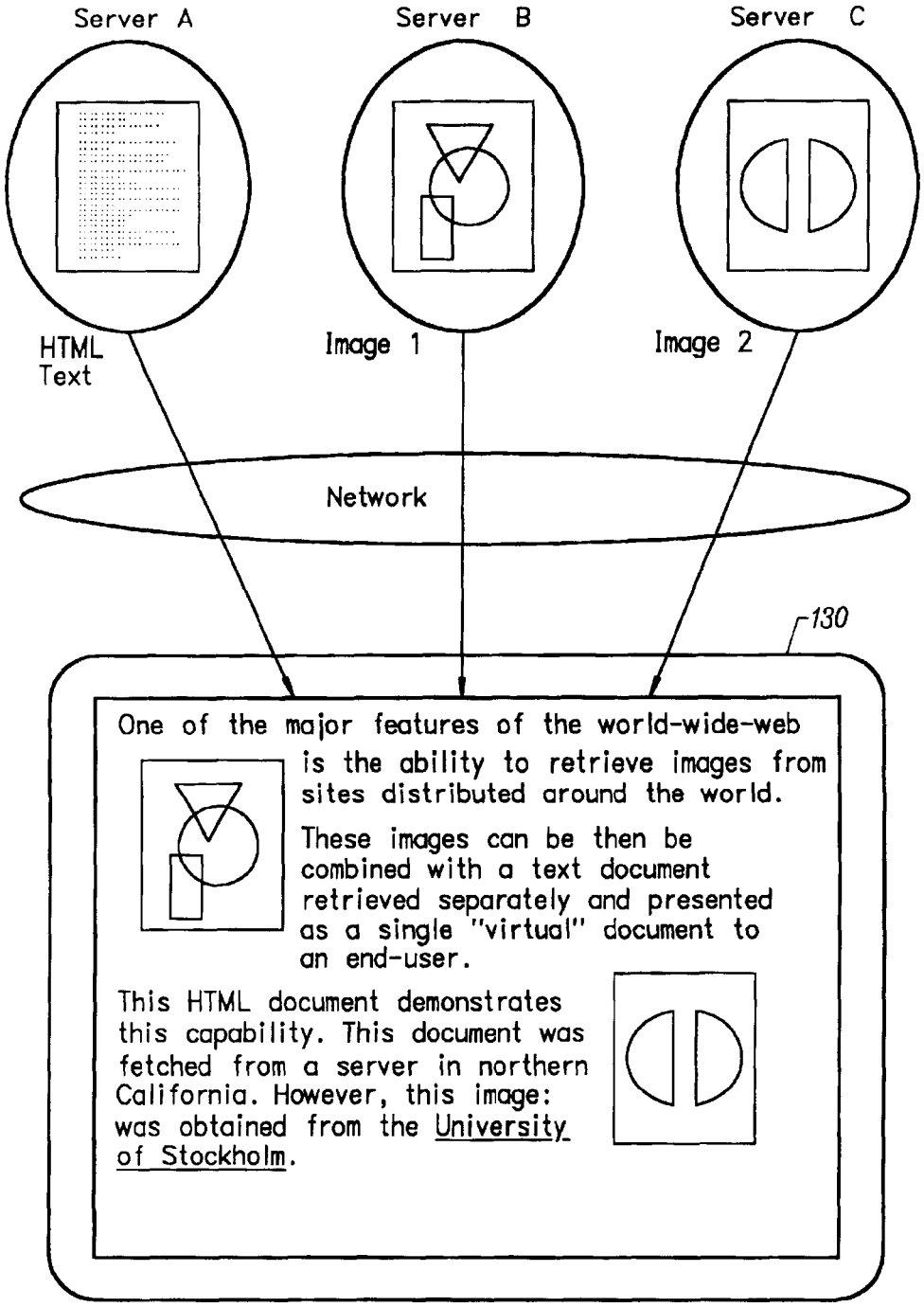
FIG. 2 illustrates the retrieval of remote text and images and their integration in a document.

FIG. 2 illustrates the retrieval of remote text and images and their integration in a Web page by a client computer 130. In FIG. 2, server A contains a text document coded in a standard HTML format. Server B contains an image file called Image 1 and server C contains another image file called Image 2. Each of these servers is remotely located from the other servers and the client 130. The transfer of data is via the Internet. It should be appreciated that the text and image files could be located in the same server which is remote from client 130.

FIG. 3A shows an example of an HTML document. FIG. 3B shows the corresponding integrated document (Web page) as it would appear on a display screen of a client computer. The first line of the document in FIG. 3A reads "<title> Distributed Image Loading Example</title>." In this case, the tags <title> and </title> are HTML delimiters corresponding to the beginning and ending, respectively, of text that is designated as the title of the HTML document. The title could be used for various purposes, such as listing of the document in an automatically generated index.

The second line of the HTML document of FIG. 3A reads "<h1> Distributed Image Loading Example </h1>" The <h1> and </h1> are HTML delimiters for a header that is to be displayed in a largest font. The browser software running on the client computer 130 interprets the header tags and thus displays the text between the header tags in a largest font size on the client's display screen.

After the title and header, the HTML document of FIG. 3A contains the text "One of the major features . . . capability". At the end of the text paragraph is another HTML tag shown as <p>. This is a tag indicating the end of a paragraph.

To continue with the second paragraph of the HTML document, the text reads "This document . . . this image: <IMG align=middle src="http://www.su.se/SUlogo.gif"> was obtained . . . ". The text in angle brackets defines an image to be placed in the text. Specifically, the "IMG" tag indicates that an image is being defined. The "align=middle" tag indicates that the image should be aligned in the middle of the current line of text. Finally, "src=" tag indicates that the source image file can be located using the URL "http://www.su.se/SUlogo.gif".

The line continues with the phrase "from the <A href="http://www.su.se/index.html"> University of Stockholm</A> This phrase defines "University of Stockholm" as a link to another Web document. Specifically, the "A" tag defines the beginning of a link. The "href=" tag defines that the link is to a Web page that can be located using the URL "http://www.su.se/index.html" Next, the text "University of Stockholm" is the text that will be the link. Finally, the "/A" tag defines the end of the link definition. As illustrated in FIG. 3B, the text "University of Stockholm" is displayed with underlining that indicates it is a link to another document. If the user selects the underlined text "University of Stockholm", then the browser will send out a http request for the Web page at the URL address "http://www.su.se/index.html".

It can be seen from the above example that the HTML document contains all information a browser needs for displaying a Web page. Thus, the only responsibility of a Web server is to provide the requested document, and there is no need for the server to request a client to do anything else. However, this role of a server also limits the utility of the Web environment.

Adding State Information to the HyperText Transfer Protocol

The present invention provides an extension to the prior art HTTP protocol. Using the teachings of the present invention, when a server responds to an http request by returning an HTTP object to a client, the server may also send a piece of state information that the client system will store. In an embodiment of the present invention, the state information is referred to as a "cookie". Included in the state information (the cookie) is a description of a range of URLs for which that state information should be repeated back to. Thus, when the client system sends future HTTP requests to servers that fall within the range of defined URLs, the requests will include a transmittal of the current value of the state object. By adding the ability to transfer state information back and forth, Web servers can then play an active role in transactions between clients and servers. The term state object is also used herein to refer to the state information.

Figure 4:
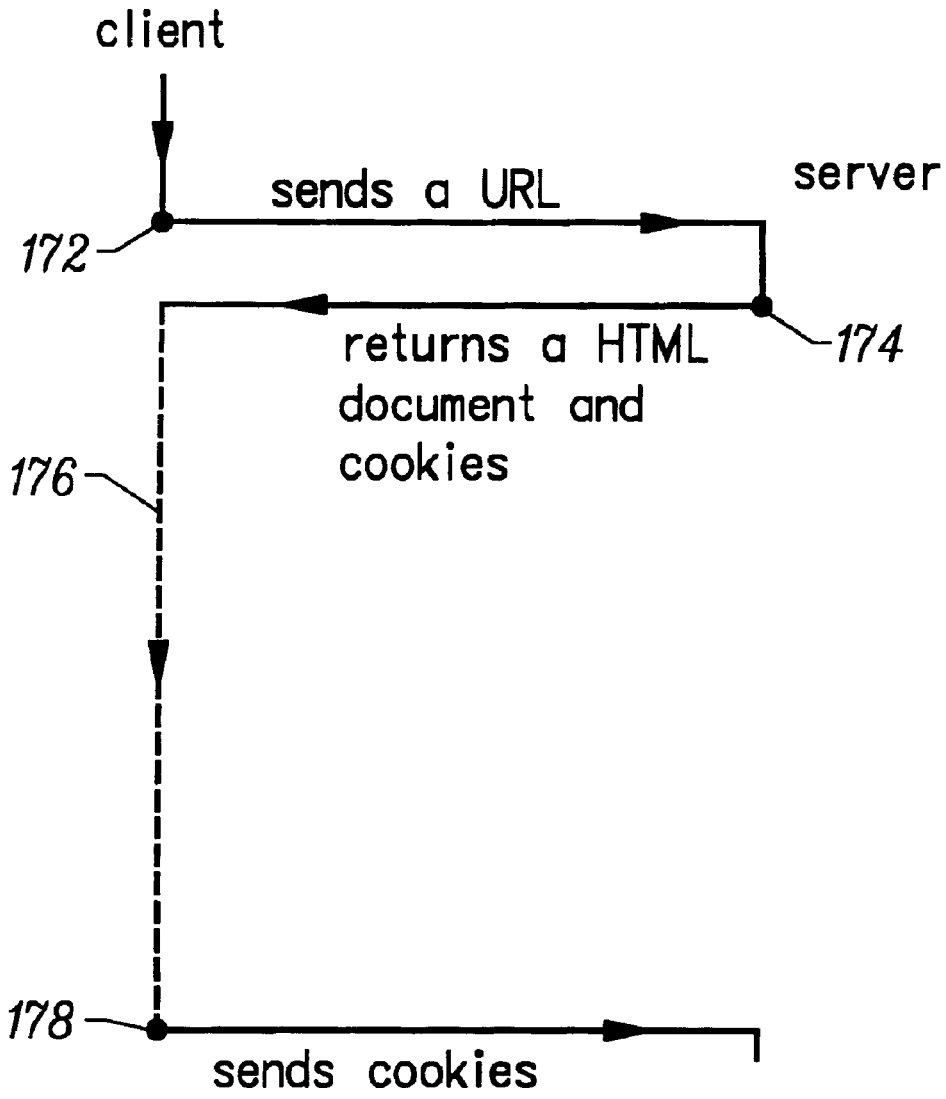
FIG. 4 shows schematically the flow of information between a client and a server in accordance with the present invention.

FIG. 4 is a drawing showing schematically the flow of information between a client system and a server system. At a time indicated by numeral 172, the client system sends an http request to the Web server. In response to the http request, the server returns an HTML document together with a header, which is typically separate from the HTML documents, at a time indicated by numeral 174. The header may contain one or more cookies. Upon receiving the HTML document and the header, the client system displays an HTML document on the screen and stores the cookies in a memory such as a storage medium. The client may switch and work on other tasks, or may be shut down completely. This is indicated by a dash line 176. At a time indicated by numeral 178, the client system may access a Web server that is specified in the received cookie, such that the client system transmits the cookies to the server, thus providing stale information about the client system to the server system.

This extension to the http protocol provides a powerful new tool which enables a large number of new types of applications to be written for a Web-based environment. Examples of new applications include on-line shopping that stores information about items currently selected by consumers, for-fee on-line services that can send back registration information and thus free users from retyping a user-id on next connection, and Web sites that can store per-user preferences on the client system and have the client supply those preferences every time the site is later accessed.

Server Behavior

A particular embodiment of the state information is described below in order to provide an example according to the present invention. It will be appreciated that alternative formats may be used in accordance with the principles of the present invention. As stated above, the extension to the HTTP protocol adds a new piece of state information to the HTTP header as part of an HTTP response from a Web server. Typically, the state information is generated by a common gateway interface ("CGI") script. The state information is stored by the receiving client system in the form of a "cookie list" for later use. The syntax of the new data, in one embodiment, is:

Set-Cookie: NAME=VALUE; expires=DATE; path=PATH;
domain=DOMAIN_NAME; secure

The capitalized terms can be set by the server system. The first attribute is "NAME=VALUE". This attribute serves to identify a cookie. The "NAME" attribute is a name for the cookie. The "NAME" attribute is the only required attribute on the "Set-Cookie" header in one embodiment. The "VALUE" is a value assigned to the previously defined name. The "VALUE" is a string of characters excluding, in one embodiment, semicolon, comma, and white spaces. If there is a need to place these characters in the VALUE, standard encoding methods, such as URL's type % XX encoding, can be used.

The "expires" attribute specifies a data string that defines the valid life time of the corresponding cookie. Once the expiration date has been reached, the cookie will no longer be stored in the client system. Thus, the client system will no longer respond to Web servers with the cookie. Many coding schemes for designating time can be used. In a preferred embodiment, the "expires" attribute is formatted as: Wdy, DD-Mon-YY HH:MM:SS GMT In the this format, "Wdy" designates the day of a week, "DD-Mon-YY" designates the day, month and year, and "HH:MM:SS GMT" designates the hour, minute and second, in GMT time zone. Note that the "expires" attribute lets a client know when it is safe to purge a cookie, however, the client is not required to delete the cookie. If an expires attribute is not provided by the server, then the cookies expires when the user's session ends. This can be implemented by storing the cookie only in volatile memory.

The "domain=DOMAIN_NAME" attribute defines a domain for which the cookie is valid. The domain attribute is usually set using the domain name of the sending Web server. Client systems examine the domain attribute when making later http requests. If the server that the client system is accessing falls within the defined DOMAIN_NAME, then the cookie may be sent to the server when making the http request. (The "path" must also be examined as will be explained later.) When a server system falls within the defined DOMAIN_NAME, this is referred to as a "tail match." Note that a domain name that defines a subset of a domain is deemed to match a larger enclosing domain. For example, the host names "anvil.acme.com" and "shipping.crate.acme.com" fall within the "acme.com" domain.

Only hosts within the specified domain can set a cookie for a domain. The value of the "domain" attribute must have at least two periods in them to prevent accepting values of the form ".com" and ".edu". If no domain name is specified, then the default value of the "domain" attribute is the domain name of the server that generated the cookie header.

The "path" attribute is used to specify a subset of file system directories in a domain for which the cookie is valid. If a cookie has already passed "domain" matching, then the path name of the URL for a requested document is compared with the "path" attribute. If there is a match, the cookie is considered valid and is sent along with the http request. All the characters of the defined path must match, however there may be additional characters on the path name. Thus, further defined subdirectories will match a path to the parent director. For example, the path "/foo" would match "/foo/bar", "/foo/bar.html", and evert "/foobar", but "/foo" will not match the path "/". Note that the path "/" is the most general path since it will match any path. If no path is specified when a cookie is created, then the default path will be the same path as the document that was sent with the header which contains the cookie.

The last element of the cookie definition is the optional label of "secure." If a cookie is marked "secure," then the cookie will only be retransmitted if there is a secure communication channel to the server system. In a preferred embodiment of the present invention, this means that the cookie will only be sent to HTTPS servers. (HTTP over SSL) If the "secure" attribute is not specified, a cookie is considered safe to be sent over unsecured channels.

The defined extension to the HTTP protocol allows multiple setcookie headers to be issued in a single HTTP response. Each set-cookie header should follow the conventions of the above described format.

Client Behavior

As previously described, when a client receives a set-cookie command in a header, the client system stores the cookie in some type of storage. In order not to place too much burden on client systems, each client system is expected to be able to store only a limited number of cookies. In one embodiment, the storage requirements for the client systems are:

(1) 300 total cookies;

(2) 4 kilobytes per cookie; and (2) 20 cookies per server or domain (note that this rule treats completely specified hosts and domains which are different as separate entities, and each entity has a 20 cookies limitation).

Servers should not expect clients to be able to exceed these limits. When the 300 total cookies or the 20 cookie per server limit is exceeded, clients may delete the least recently used cookie even if the cookie's "expires" time has not passed.

If a cookie is received that matches the "NAME", "domain" and "path" attributes of a previously received cookie, then the previously received cookie will be overwritten. Using this technique, it is possible for a server to delete a cookie previously sent to a client. Specifically, a server that wishes to delete a previous cookie sends a cookie having "expires" time which is in the past that matches the "NAME", "domain" and "path" attributes of cookie to be deleted. Since the new overwritten cookie contains a expires time that has passed, the cookie will be deleted by the client system. Note "NAME", "domain" and "path" attributes of the expired cookie must match exactly those of the valid cookie. Since a system must be within the domain that is specified in the domain attribute, it is difficult for any server other than the originator of a cookie to delete or change a cookie.

When a client system that implements the present invention wishes to send an http request to a particular Web server, the client system first examines its cookie list to see if the cookie list contains any matching cookies that need to be sent to the particular Web server. Specifically, before the client sends an http request to a Web server, the client compares the URL of the requested Web document against all of the stored cookies. If any of the cookies in the cookie list matches the requested URL then information containing the name/value pairs of the matching cookies will be sent along with the HTTP request. The format of the line is:

Cookie: NAME1=value1; NAME2=value2; . . .

When a client sends cookies to a server, all cookies with a more specific path mapping should be sent before cookies with less specific path mappings. For example, a cookie "name1=foo" with a path mapping of "/bar" should be sent before a cookie "name2=foo2" with a path mapping of "/" if they are both to be sent since the path "/bar" is more specific than the global matching path "/".

Paths having a higher-level value do not override more specific path mappings. If there are multiple matches for a given cookie name, but with separate paths, all the matching cookies will be sent. Thus, both the cookie "name=foo" with a path mapping of "/bar" and the cookie "name=foo" with a path mapping of "/" should be sent since they have different path names.

Some clients access Web servers on the Internet through firewall systems that are designed to prevent unwanted Internet traffic from affecting a local area network coupled to the Internet. Firewall systems often implement "proxy servers" that filter traffic to and from the Internet. It is important that proxy servers not cache Set-cookie commands when caching HTTP information. Thus, if a proxy server receives a response that contains a Set-cookie header, the proxy server should immediately propagate the Set-cookie header to the client. Similarly, if a client system request contains a "Cookie:" header, the cookie header should be forwarded through a proxy even if a conditional "If-modified-since" request is being made.

To further describe the present invention, the following examples describe a set of Web transactions operating in accordance with the present invention:

EXAMPLE 1

A client system requests a Web document from the Web server "telemarking.acme.com" and receives in response:

Set-Cookie: CUSTOMER=WILE_E_COYOTE; path=/; expires=Wednesday, Nov. 9, 1999 23:12:40

The client system stores this cookie in a local (client-side) storage unit (e.g. mass storage 127 or memory 125). Since no domain name was specifically identified, the domain will be set to "telemarking.acme.com" since that is the domain name of the server that generated the cookie. When the client later makes an http request for a document in any path (since the path is "/") of a server system in the telemarking.acme.com domain, the client sends:

Cookie: CUSTOMER=WILE_E_COYOTE

Assuming the client system makes another request to the telemarking.acme.com domain, the client might receive another cookie from the server such as:

Set-Cookie: PART_NUMBER=ROCKET_LAUNCHER; path=/

The client will locally store this additional cookie. Again, no domain name was identified, such that the default domain, "telemarking.acme.com" will be stored. Now, if the client makes yet another request to the "telemarking.acme.com" domain, the client will send all the cookies it has for that domain. Specifically, the client sends:

Cookie: CUSTOMER=WILE_E_COYOTE; PART_NUMBER=ROCKET_LAUNCHER

Assuming, the client continues transactions with the "telemarking.acme.com" server, it may receive the following cookie from the server:

Set-Cookie: SHIPPING=FEDEX; path=/foo

Then, if the client requests a document in path "/" on the "telemarking.acme.com" server, the client will send two cookies as state information:

Cookie: CUSTOMER=WILE_E_E_COYOTE; PART_NUMBER-ROCKET_LAUNCHER

Note that the cookie SHIPPING=FEDEX was not sent because the path "/" does not match the path "/foo". On the other hand, when the client requests a document on the "telemarking.acme.com" server in path "/foo" on this server, then the client will send three cookies as state information;

Cookie: CUSTOMER=WILE_E_COYOTE; PART_NUMBER=ROCKET_LAUNCHER; SHIPPING=FEDEX

EXAMPLE 2

Assume that all of the transactions of Example 1 have been cleared. A client system then requests a Web document from the Web server "telemarking.acme.com" and receives in response:

Set Cookie: PART_NUMBER=ROCKET_LAUNCHER__1; path=/

The client stores this cookie in a local (client-side) storage unit. Since no domain name was specifically identified, the domain will be set to "telemarking.acme.com". When the client later makes a request to a document in any path of a system in the telemarking.acme.com domain, the client sends back the following data as information:

Cookie: PART_NUMBER=ROCKET_LAUNCHER__1

Assuming the client continues to access the "telemarking.acme.com" server, the client may later receive from the server:

Set-Cookie: PART_NUMBER=RIDING_ROCKET__23; path=/ammo

The new cookie has the same name (PART_NUMBER) as an old cookie stored on the client system. Note that the old cookie is not overwritten since the new cookie has a different path attribute: Now, if the client makes a request for a document in the path "/ammo" on the telemarking.acme.com" server, the client should send the following two cookies as state information:

Cookie: PART_NUMBER=RIDING_ROCKET__23; PART_NUMBER=ROCKET_LAUNCHER__1

Both cookies are sent since the path of the requested document ("/ammo") matches both the "/" path of the first cookie and the "/ammo" path of the second cookie. Note that the cookie PART_NUMBER=RIDING_ROCKET__23 is sent first since it has a more specific path ("/ammo") than the global path ("/") associated with the cookie PART_NUMBER=ROCKET_LAUNCHER__1.

An On-line Shopping System Application

Figure 5:
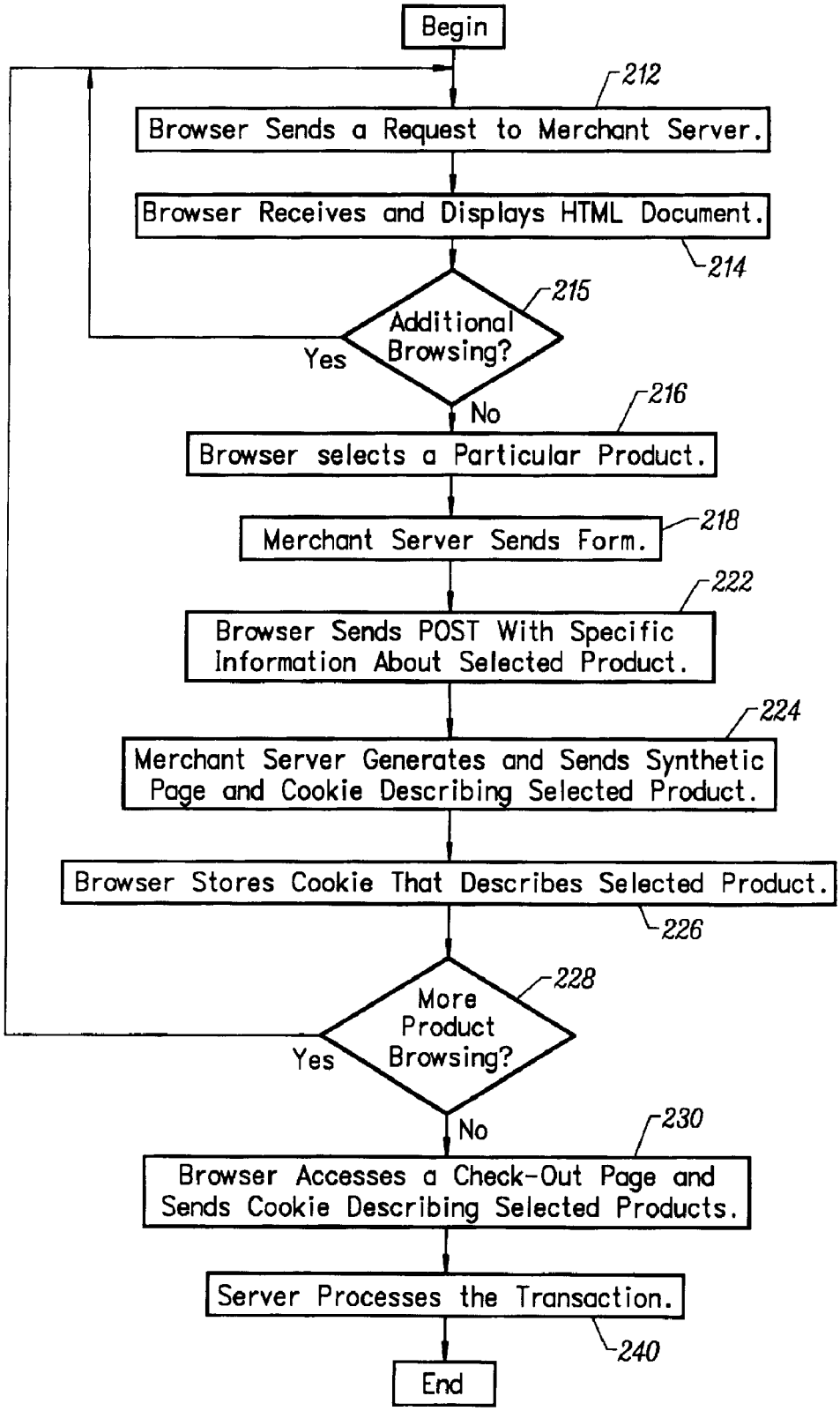
FIG. 5 is a flow chart showing the operation of a merchant system of the present invention.
Figure 6:
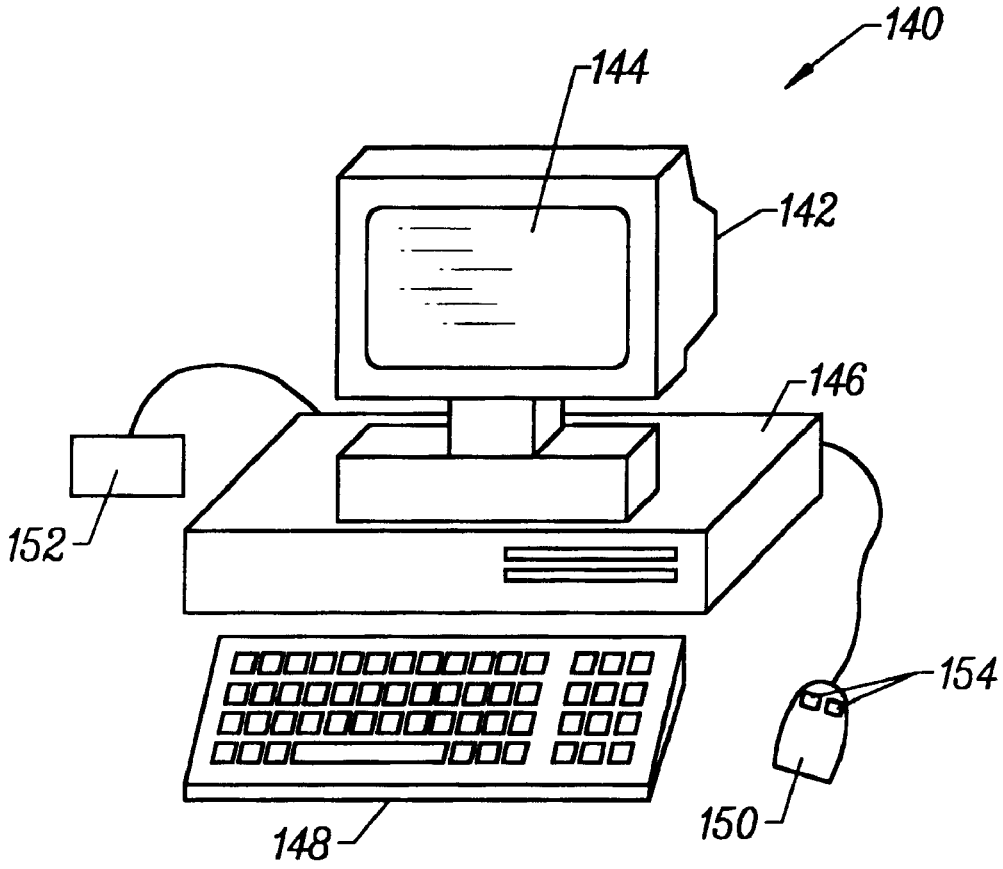
FIG. 6 shows a computer system that could be used to run the browser of the present invention.

To illustrate one possible use of the state information system of the present invention, an implementation of an on-line shopping system will be described. The on-line shopping system allows customers to shop in one or more stores that are implemented as Web servers on the Internet. A customer can browse information on the Web servers that describe products available from the stores. When a desired product is found, the user can place the product into a "virtual shopping basket." The virtual shopping basket is implemented as a set of cookies that are sent to the client computer system and stored on the client computer system. At check-out time, the customer pays for the selected products using some type of payment system such as a credit card. After payment is received, the on-line shopping system notifies the stores to ship the selected products to the customer. FIG. 5 is a flow chart showing the operation of the merchant system during an on-line shopping "trip" by a customer. The customer can run a browser on a client computer system, such as computer system 140 shown in FIG. 6 or client system 120 shown in FIG. 1B The computer system 140 of FIG. 6 includes a display device 142 (such as a monitor), a display screen 144, a cabinet 146 (which encloses components typically found in a computer, such as CPU, RAM, ROM, video card, hard drive, sound card, serial ports, etc.), a keyboard 148, a mouse 150, and a modem 152. Mouse 150 have one or more buttons, such as buttons 154. The computer needs to have some type of communication device such as that Modem 152 allows computer system 140 to be connected tb the Internet. Other possible communication devices include ethernet network cards.

The customer uses Web browser software to access an on-line "merchant" server that is operated by a merchant having products to sell. This merchant server is a server computer system such as server system 122 shown in FIG. 1B. Specifically, the browser software sends an http request for the home Web page of a merchant Web server (step 212). The merchant Web server responds to the request with an HTML document that is displayed by the browser (step 214). The home Web page contains information about the merchant and its products (e.g., shoes, hats, shirts, etc.). The home Web page can implement a set of linked Web pages that describe the products that are available from the merchant. Each product may be associated with its own HTML document that fully describes the product. Products can be described using text, images, sounds, video clips, and any other communication form supported by Web browsers. The user can continue browsing through Web pages of the merchant server by repeating steps 212, 214, and 215.

After browsing through the Web pages provided by the server, the customer may select a product (step 216) by, for example, "clicking" (in the conventional manner) on an image of a product that causes the browser to request a Web page that fully describes the product. If the customer wishes to buy shoes from the merchant, the customer could click on a "buy it" button. The merchant server then sends an HTML form document that requests the customer to send necessary details for the purchase (step 218). For example, the customer may select a quantity, a desired style, and size of the product as requested by the form document. The browser then sends a POST command under HTTP, which transmits the data entered into the form to the merchant server (step 222). The data on the submitted form (e.g., quantity, size, style, etc.) is analyzed by the server and the transaction is processed. The server then generates a synthetic page and sends it to the browser running on the client system. This synthetic page preferably contains a thank you note along with confirmation information. Cookies containing information describing the selected product are also sent at this time (step 224).

The browser software running on the client system stores the cookies describing the selected products within the client computer system (step 226). The stored cookies include an identification of the contents of a virtual shopping basket that contains the products selected by the consumer. In an embodiment of the present invention, the cookies are stored in a file located in a storage medium (such as a hard disk) of client computer system 140.

The time interval for storing the cookies that describe the selected products can be set to any desired length. In one embodiment of the present invention, the cookies are deleted when the customer exits from the browser. This can be accomplished by not setting the "expires" attribute of the product description cookies. In another embodiment of the present invention, the cookies are kept valid (prior to their expiration) even after the customer exits from the browser and turns off computer 140. This can be accomplished by setting the "expires" attribute of the product description cookies to a later date.

After selecting a product, the customer may do additional shopping (e.g., buy a hat) from the same store or other stores (step 228). In this case, steps 212, 214, 215, 216, 218, 222, 224 and 226 need to be performed for the additional products. Each selection of a product in step 222 will result in the transmission of a cookie from the server to the client, which cookie identifies the selected product. The customer may also exit from the merchant system at any time.

When the customer desires to buy the products, the customer accesses a link that identifies a "check-out" Web page. The check-out Web page causes the browser to send all the product description cookies (230). Thus, the check-out Web page empties out the virtual shopping basket. The merchant server generates a total bill for all the products in the virtual shopping basket. The server may then request billing information (e.g., credit card number) and shipping (e.g., address) information from the customer using a form. In a preferred embodiment the transaction of credit card information is transmitted using a secure medium. The transaction server then performs a real-time credit card authorization. Once the transaction is authorized, transaction server sends messages to individual merchants to fulfill the order (step 240).

Other functions could be added to the above described merchant system. For example, several persons could use the same browser for shopping. In this case, the browser identifies the person doing the shopping, and assigns product description cookies to the appropriate person. Thus, each person would have their own virtual shopping basket.

The invention has been described with reference to specific exemplary embodiments thereof and various modifications and changes may be made thereto without departing from the broad spirit and scope of the invention. The specification and drawings are, accordingly, to be regarded in an illustrative rather than a restrictive sense; the invention is limited only by the following claims.

What is claimed is:

[1. A method for subscribing to an on-line information service, said method comprising the steps of:

requesting a first information service from an http server; and transmitting a state object from a client computer system to said http server, said state object being stored on said client system and specifying user information to said http server.]

[2. A method as in claim 1 wherein said state object specifies user identification information and billing information.]

[3. A method as in claim 1 further comprising:

requesting a second information service from said http server or an alternative http server;

transmitting said object to said http server or said alternative http server.]

[4. A method as in claim 3 wherein a user of said on-line information service browses from said first information service to said second information service without having to enter user information.]

[5. A method of claim 3 wherein said user information comprises subscription information required by a first publisher of said first information service.]

[6. A method as in claim 5 wherein said user information comprises subscription information required by a second publisher of said second information service.]

*7. A computer-implemented method performed by a hardware server system, comprising:*

*receiving, at the server system, a hypertext transfer protocol (HTTP) request from a client;*

*responding to the HTTP request by transmitting an HTTP response to the client wherein the HTTP response includes an HTTP header, the HTTP header including at least one set-cookie instruction specified by a "Set-Cookie:" text string, wherein the set-cookie instruction includes:*

*a name-value pair, the name-value pair specifying an assignment of a particular value to a particular name and being specified in the set-cookie instruction by a text string in a "NAME=VALUE" format; and*

*attribute information, wherein the attribute information specifies criteria to enable the client to determine whether to return the name-value pair to the server system with a subsequent HTTP request and wherein the attribute information includes:*

*a domain attribute that specifies a domain for which the name-value pair is valid, the domain being specified in the set-cookie instruction as a text string in a "domain=DOMAIN" format;*

*a path attribute specifying a range of Uniform Resource Locators (URLs), in a domain of the server system, for which the name-value pair is valid, the path attribute being specified in the set-cookie instruction as a text string in a "path=PATH" format; and*

*an expiration attribute that specifies a valid life time for the name-value pair, the valid life time specifying the persistent storage of the name-value pair across one or more browser sessions, each browser session corresponding to a period during which a browser application is running on the client, and terminating on a specified date, the expiration attribute being specified in the set-cookie instruction as a text string in a "expires=DATE" format.*

*8. The method of claim 7, further comprising: receiving a subsequent HTTP request from the client, wherein the subsequent HTTP request includes the name-value pair, and using the received name-value pair to identify a user.*

*9. The method of claim 8, wherein the HTTP request is received by a first server in the server system within a domain; and wherein the subsequent HTTP request is received by a second server in the server system within the domain, the second server being a different server from the first server.*

*10. The method of claim 7, wherein the HTTP header additionally includes a "secure" label indicating that the client should only send the name-value pair over a secure communication channel.*

*11. The method of claim 7, wherein the name-value pair includes a user identifier.*

*12. The method of claim 7, wherein the name-value pair includes information used by the server system to determine user preference information.*

*13. A computer storage device storing a computer program that embodies the method of claim 7.*

*14. The method of claim 7, wherein the name-value pair includes subscription information used by the server system to determine whether a user is authorized to access restricted content.*

*15. The method of claim 7, wherein the name-value pair includes information used by the server system to associate a user with one or more items selected for purchase.*

*16. The method of claim 7, wherein the HTTP response includes HTML content.*

*17. A computer-implemented server system, for use in a communications network, comprising:*

*a processing system comprising one or more processors; and*

*a memory comprising one or more computer readable media, wherein the memory stores computer instructions that, when executed by the processing system, cause the server system to perform the operations of:*

*receiving, from a client, a hypertext transfer protocol (HTTP) request;*

*sending, in response to the HTTP request, an HTTP response, wherein the HTTP response includes an HTTP header that includes at least one set-cookie instruction specified by a "Set-Cookie:" text string, wherein the set-cookie instruction includes:*

*a name-value pair, the name-value pair specifying an assignment of a particular value to a particular name and being specified in the set-cookie instruction by a text string in a "NAME=VALUE" format; and*

*attribute information, wherein the attribute information specifies criteria to enable the client to determine whether to return the name-value pair to the server system with a subsequent HTTP request and wherein the attribute information includes:*

*a domain attribute that specifies a domain for which the name-value pair is valid, the domain being specified in the set-cookie instruction as a text string in a "domain=DOMAIN" format;*

*a path attribute that specifies a range of uniform resource locators for which the name-value pair is valid in a domain of the server system, the path being specified in the set-cookie instruction as a text string in a "path=PATH" format; and*

*an expiration attribute that specifies a valid life time for the first name-value pair, the valid life time specifying the persistent storage of the name-value pair across one or more browser sessions, each browser session corresponding to a period during which a browser application is running on the client, and terminating on a specified date, the expiration attribute being specified in the set-cookie instruction as a text string in a "expires=DATE" format.*

*18. The server system of claim 17, wherein the memory further stores computer instructions for performing the operations of:*

*receiving a subsequent HTTP request from the client, wherein the subsequent HTTP request includes the name-value pair; and*

*using the received name-value pair to identify a user.*

*19. The server system of claim 18, wherein the HTTP request is received by a first server in the server system within a domain; and wherein the subsequent HTTP request is received by a second server in the server system within the domain, the second server being a different server from the first server.*

*20. The server system of claim 17, wherein the HTTP header in the HTTP response further includes a secure attribute that specifies that the name-value pair should be returned by the client in a subsequent HTTP request only if the subsequent HTTP request is made using a secure channel.*

*21. The server system of claim 17, wherein the name-value pair includes a user identifier.*

*22. The server system of claim 17, wherein the name-value pair includes subscription information used by the server system to determine whether a user is authorized to access restricted content.*

*23. The server system of claim 17, wherein the name-value pair includes information used by the server system to associate a user with one or more items selected for purchase.*

*24. The server system of claim 17, wherein the name-value pair includes information used by the server system to determine a user's preferences.*

*25. The server system of claim 17, wherein the HTTP response includes HTML content.*

*26. A computer-implemented method performed by a hardware client system, the method comprising:*

*sending a first hypertext transfer protocol (HTTP) request to a server system during a first browsing session, the first browsing session corresponding to a period of time during which a browser application is running on the client system;*

*receiving an HTTP response from the server system, wherein the HTTP response includes an HTTP header, the HTTP header specifying a "Set-Cookie:" text string and including:*

*a name-value pair;*

*a domain attribute that specifies a domain for which the name-value pair is valid,*

*a path attribute that specifies a range of uniform resource locators (URLs) for which the name-value pair is valid in the domain, and*

*an expiration attribute that specifies a valid life time for the name-value pair;*

*storing the name-value pair on the client system such that the name-value pair is related to at least the domain attribute and the path attribute;*

*subsequently, determining whether the name-value pair is valid for a URL of a second HTTP request by the client system made during a second browsing session, the second browsing session corresponding to a period of time during which a browser application is running on the client system and differing from the first browsing session, wherein determining whether the name-value pair is valid comprises comparing the URL to the domain attribute and the path attribute, and determining whether the second HTTP request is made at a time within the valid life time; and*

*when the name-value pair is determined to be valid, transmitting the name-value pair within an HTTP header in the second HTTP request according to a "Cookie: NAME=VALUE" format.*

*27. The method of claim 26, wherein the HTTP header in the HTTP response additionally includes a "secure" label that specifies to the client system that the name-value pair should only be transmitted over a secure communication channel.*

*28. The method of claim 26, further comprising, on the client system:*

*subsequent to storing the name-value pair on the client system, receiving a second HTTP header from the server system, the second HTTP header specifying a second name-value pair, a second domain attribute, and a second path attribute;*

*determining whether three conditions are met: (1) a name portion of the second name-value pair matches a name portion of the stored named-value pair, (2) the second domain attribute matches the domain attribute of the stored name-value pair, and (3) the second path attribute matches the path attribute of the stored name-value pair; and*

*when the three conditions are met, overwriting the stored name-value pair on the client system with the second name-value pair.*

*29. A non-transitory computer-readable medium that stores a browser program which embodies the method of claim 26.*

*30. The method of claim 26, further comprising:*

*determining whether the date specified by the expiration attribute is before a current date and deleting the name-value pair from memory when the date specified by the expiration attribute is before a current date.*

*31. A client system, comprising:*

*a processing system comprising one or more processors;*

*a memory comprising one or more computer-readable media, the memory containing computer instructions that, when executed by the processing system, cause the client system to perform the operations of:*

*sending a first hypertext transfer protocol (HTTP) request to a server system during a first browsing session, the first browsing session corresponding to a period of time during which a browser application is running on the client system;*

*receiving, in response to the first HTTP request, an HTTP response from the server system, wherein the HTTP response includes an HTTP header that specifies a "Set-Cookie:" text string and includes:*

*a name-value pair;*

*a domain attribute that specifies a domain for which the name-value pair is valid,*

*a path attribute that specifies a range of uniform resource locators for which the name-value pair is valid in the domain, and*

*an expiration attribute that specifies a valid life time for the name-value pair;*

*storing, in memory, the name-value pair;*

*sending a second HTTP request to the server system, during a second browsing session, the second browsing session corresponding to a period of time during which a browser application is running on the client system and differing from the first browsing session, wherein the second HTTP request specifies a domain and a resource; and*

*including the name-value pair in an HTTP header in the second HTTP request according to a "Cookie: NAME=VALUE" format only if:*

*the domain specified by the second HTTP request is within the domain specified by the domain attribute,*

*the resource specified by the second HTTP request is within the path specified by the path attribute, and ullispecified by the expiration attribute.*

*32. The client system of claim 31, wherein the memory further includes instructions for performing the operation of:*

*determining whether the date specified by the expiration attribute is before a current date and deleting the name-value pair from memory when the date specified by the expiration attribute is before a current date.*

*33. The client system of claim 31, wherein:*

*the HTTP header in the HTTP response further includes a secure attribute that specifies that the name-value pair should be returned by the client system in a subsequent HTTP request only if the subsequent HTTP request is made using a secure channel; and*

*wherein sending the second HTTP request to the server system further comprises:*

*including the name-value pair in the HTTP header in the second HTTP request only if the second HTTP request is made using a secure channel.*

*34. A computer-implemented method performed by a hardware server system, comprising:*

*receiving, at the server system, a hypertext transfer protocol (HTTP) request from a client for an HTML document;*

*responding to the HTTP request by transmitting an HTTP response to the client, wherein the HTTP response includes the requested HTML document and an HTTP header, the HTTP header including at least one set-cookie instruction specified by a "Set-Cookie:" text string, wherein the set-cookie instruction includes:*

*a name-value pair, the name-value pair specifying an assignment of a particular value to a particular name and being specified in the set-cookie instruction by a text string in a "NAME=VALUE" format, wherein the name-value pair includes information descriptive of the requested HTML document; and*

*attribute information, wherein the attribute information specifies criteria to enable the client to determine whether to return the name-value pair to the server system with a subsequent HTTP request and wherein the attribute information includes:*

*a domain attribute that specifies a domain for which the name-value pair is valid, the domain being specified in the set-cookie instruction as a text string in a "domain=DOMAIN" format;*

*a path attribute specifying a range of Uniform Resource Locators (URLs), in a domain of the server system, for which the name-value pair is valid, the path attribute being specified in the set-cookie instruction as a text string in a "path=PATH" format; and*

*an expiration attribute that specifies a valid life time for the name-value pair, the valid life time specifying the persistent storage of the name-value pair across one or more browser sessions, each browser session corresponding to a period during which a browser application is running on the client, and terminating on a specified date, the expiration attribute being specified in the set-cookie instruction as a text string in a "expires=DATE" format.*

* * * * *